US006634559B2

(12) United States Patent
Shioda et al.

(10) Patent No.: US 6,634,559 B2
(45) Date of Patent: Oct. 21, 2003

(54) DATA SHEET AND INFORMATION MANAGEMENT SYSTEM USING DATA SHEET

(75) Inventors: Reiju Shioda, Kanagawa (JP); Sadao Takahashi, Kanagawa (JP); Toshiyuki Furuta, Kanagawa (JP); Koichi Ejiri, Chiba (JP); Tomio Kubota, Kanagawa (JP); Minoru Morikawa, Kanagawa (JP); Naoki Kozuka, Kanagawa (JP); Hitoshi Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/819,650

(22) Filed: Mar. 29, 2001

(65) Prior Publication Data

US 2001/0054648 A1 Dec. 27, 2001

(30) Foreign Application Priority Data

Mar. 31, 2000 (JP) ........................................ 2000-099646
Sep. 22, 2000 (JP) ........................................ 2000-289368

(51) Int. Cl.[7] ............................................... G06K 19/00
(52) U.S. Cl. .................................. 235/487; 235/462.01
(58) Field of Search ................................. 235/487, 491, 235/492, 462.01, 468, 469, 462.09

(56) References Cited

U.S. PATENT DOCUMENTS 5,530,235 A * 6/1996 Stefik et al. ................. 235/492
5,783,809 A * 7/1998 Nino et al. ................... 235/380
5,869,421 A * 2/1999 Kutami et al. ............... 503/201
5,902,968 A    5/1999 Sato et al.
5,933,548 A * 8/1999 Morisawa .................... 382/305
5,973,731 A * 10/1999 Schwab ....................... 235/380
5,981,884 A   11/1999 Sato et al.
6,005,482 A * 12/1999 Moran et al. ................ 235/375
6,084,577 A    7/2000 Sato et al.
6,229,102 B1   5/2001 Sato et al. ................. 178/14.01
6,329,035 B1 * 12/2001 Iwasaki et al. ............ 428/64.01
6,522,347 B1 *  2/2003 Tsuji et al. .................. 345/848

FOREIGN PATENT DOCUMENTS

JP          7-121673          5/1995
JP          9-282422         10/1997

* cited by examiner

*Primary Examiner*—Daniel St. Cyr
(74) *Attorney, Agent, or Firm*—Oblon, Spivak, McClelland, Maier & Neustadt, P.C.

(57) ABSTRACT

A data sheet is composed of an upper part and a lower part. The upper part is used as a user interface including a reduced image of contents of a document. The lower part is an interface for a reading device such as a copy machine, including a code obtained by encoding the document. By use of the data sheet, the user can easily distribute or carry an electronic document data with the user. In addition, the user can recognize contents of the electronic document data by looking at the reduced image printed on the data sheet.

40 Claims, 21 Drawing Sheets

| INGREDIENTS | MIX RATIO |
|---|---|
| $\gamma$-Fe2O3 | 10 |
| VINYL CHLORIDE - ACETATE ALCOHOL COPOLYMER (UCC CORPORATION, VAGH) | 2 |
| CORONET L (10% TOLUENE SOLUTION) | 2 |
| METHYL-ETHYL KETONE | 43 |
| TOLUENE | 43 |

FIG.23

| MEDIUM CHARACTERISTIC NUMBER | COLOR-REMOVING TEMPERATURE | COLOR-DEVELOPING TEMPERATURE | CONVEYING SPEED |
|---|---|---|---|
| XXXX1 | 125°C | 175°C | 30mm/sec |
| XXXX2 | 120°C | 174°C | 28mm/sec |
| XXXX3 | 123°C | 174°C | 29mm/sec |

DATA SHEET AND INFORMATION MANAGEMENT SYSTEM USING DATA SHEET

BACKGROUND OF THE INVENTION

1. Field of the Invention

The present invention relates to a data sheet, a data-sheet creating device, an information-printing device, an information-management system and a recording medium storing a program readable by the data-sheet creating device for controlling the data-sheet creating device.

2. Description of the Related Art

Japanese Laid-Open Patent Application No. 7-121673 discloses a method and an apparatus for supplying information. According to the method and the apparatus for supplying information, text information expressed in letters and bar-coded information equivalent to the text information is printed on a single sheet of paper by relating the bar-coded information to the text information. In a case in which the text information is to be used by an electronic media, the bar-coded information is read, and information related to the bar-coded information is outputted from the electronic media. According to the above-described method, information equivalent to the text information is recorded as a bar code on the single sheet of paper. However, in fact, output information corresponding to the bar code must be searched, and outputted to a user. Thus, a storage unit is always necessary for storing the corresponding output information. In other words, the bar code holds only identification information about information outputted by the electronic media.

On the other hand, Japanese Laid-Open Patent Application No. 9-282422 discloses a printed matter. Visible information is recorded on a recording sheet (the printed matter). Additionally, address information is invisibly recorded on the recording sheet so that the address information corresponds to a part in the visible information, the part corresponding to related information stored at an address indicated by the address information in a magnetic disk device. Furthermore, marks are visibly recorded on the recording sheet, indicating that the above-described related information is stored in the magnetic disk device.

As a conventional technology related to a recording medium, there exists a card having a rewritable displaying function. In a field of cards owned by individuals, addition of the rewritable displaying function to the card enables displaying of a visible image corresponding to updated contents or specified contents at dealings, for instance, thereby enabling displaying of information necessary for a user at the dealings.

Additionally, with recent advancement of computers and network technologies, consumption of paper by printers and the like has increased. With such increased consumption of paper, destruction of forests, a garbage disposal problem, a temperature rise caused by an increase in an amount of carbon dioxide in the air, and the like, so called environmental problems have been occurring. Accordingly, it is requested to reduce the consumption of paper.

To solve the above-described problem, rewritable paper using a reversible recording material is suggested as a medium equivalent to paper, on which information can be recorded or erased repeatedly. Considering the environmental problems, market needs for rewritable materials including the rewritable paper has risen, and, thus, the use of the rewritable paper is not limited in the field of cards. For instance, a system using a document by printing the document on the rewritable paper is very effective. However, characteristics of a color development speed and a color removal speed on a heat reversible recording medium differ with an individual manufacturer of the heat reversible recording medium and an individual method of compounding ingredients. Thus, unless appropriate color development and removal operations are performed for the individual manufacturer and methods of compounding ingredients, a developed color becomes light, or some colors cannot be removed. Additionally, unevenness of the developed or removed color occurs on the heat reversible recording medium.

However, printing devices on the market perform constant color development and removal operations. In details, a printing device that has a specification matching a characteristic of a single displaying medium can hardly achieve complete color development and removal on various displaying mediums having different characteristics.

SUMMARY OF THE INVENTION

Accordingly, it is a general object of the present invention to provide a data sheet, a data-sheet creating device, an information-printing device, an information-management system and a recording medium storing a program readable by the data-sheet creating device for controlling the data-sheet creating device.

A more specific object of the present invention is to provide a data sheet using only a recording sheet such as paper as a medium, by which electronic document data can be distributed or carried with a user, and the user can recognize information recorded on the recording sheet from a text or the like expressed on the recording sheet. Another object of the present invention is to provide a data-sheet creating device that creates the data-sheet, an information-printing device, an information-management system, and a recording medium storing a program readable by the data-sheet creating device for controlling the data-sheet creating device. Yet, another object of the present invention is to provide a data-sheet creating device that can stably print information to or erase information from data-sheets having different color-developing and color-removing characteristics, so that an office environment shifts from an environment in which information is printed on paper, to an environment in which the information is printed on a rewritable data sheet.

The above-described objects of the present invention are achieved by a data sheet readable by a reading device, including a first area storing entire data obtained by encoding all information included in a document, and a second area storing a reduced image of at least a part of the document for a user to preview the document.

The above-described objects of the present invention are also achieved by a data-sheet creating device that records data on a data sheet, the data sheet including a first area and a second area, the data-sheet creating device including a data-recording unit recording an entire document in the first area by encoding the entire document to a code readable by a reading device, and recording a reduced image of at least a part of the document in the second area for a user to preview the document.

The above-described objects of the present invention are also achieved by a recording medium readable by a computer, tangibly embodying a program of instructions executable by the computer to create a data sheet including a fist area and a second area, the program including the steps of recording an entire document on the first area by encoding the entire document to a code readable by the computer, and recording a reduced image of at least a part of the document on the second area for a user to preview the document.

The above-described objects of the present invention are also achieved by an information-printing device printing an electronic document, based on a data sheet that includes a first area storing encoded information obtained by encoding an entire document and a second area storing a reduced image of at least a part of the document for a user to preview the document, the information-printing device including a data reading unit reading the encoded information from the data sheet, a decoding unit decoding the encoded information to obtain decoded information, and a printing unit printing information corresponding to at least the part of the document included in the reduced image among the decoded information.

The above-described objects of the present invention are also achieved by an information-management system managing document information by use of a data sheet including a first area and a second area, including a data-recording unit recording an entire document in the first area by encoding the entire document to a code readable by a computer, and recording a reduced image of at least a part of the document in the second area for a user to preview the document; a data reading unit reading the code from the data sheet; a decoding unit decoding the code to obtain decoded document; and a printing unit printing at least the part of the document included in the reduced image among the decoded document.

By use of the data sheet, a user can easily distribute or carry an electronic document data with the user. In addition, the user can recognize contents of the electronic document data by looking at the reduced image printed on the data sheet.

Other objects, features and advantages of the present invention will become more apparent from the following detailed description when read in conjunction with the accompanying drawings.

BRIEF DESCRIPTION OF THE DRAWINGS

FIG. 23 is a diagram showing a table stored in a memory of the information-management system shown in FIG. 22;

DESCRIPTION OF THE PREFERRED EMBODIMENTS

Figure 1:
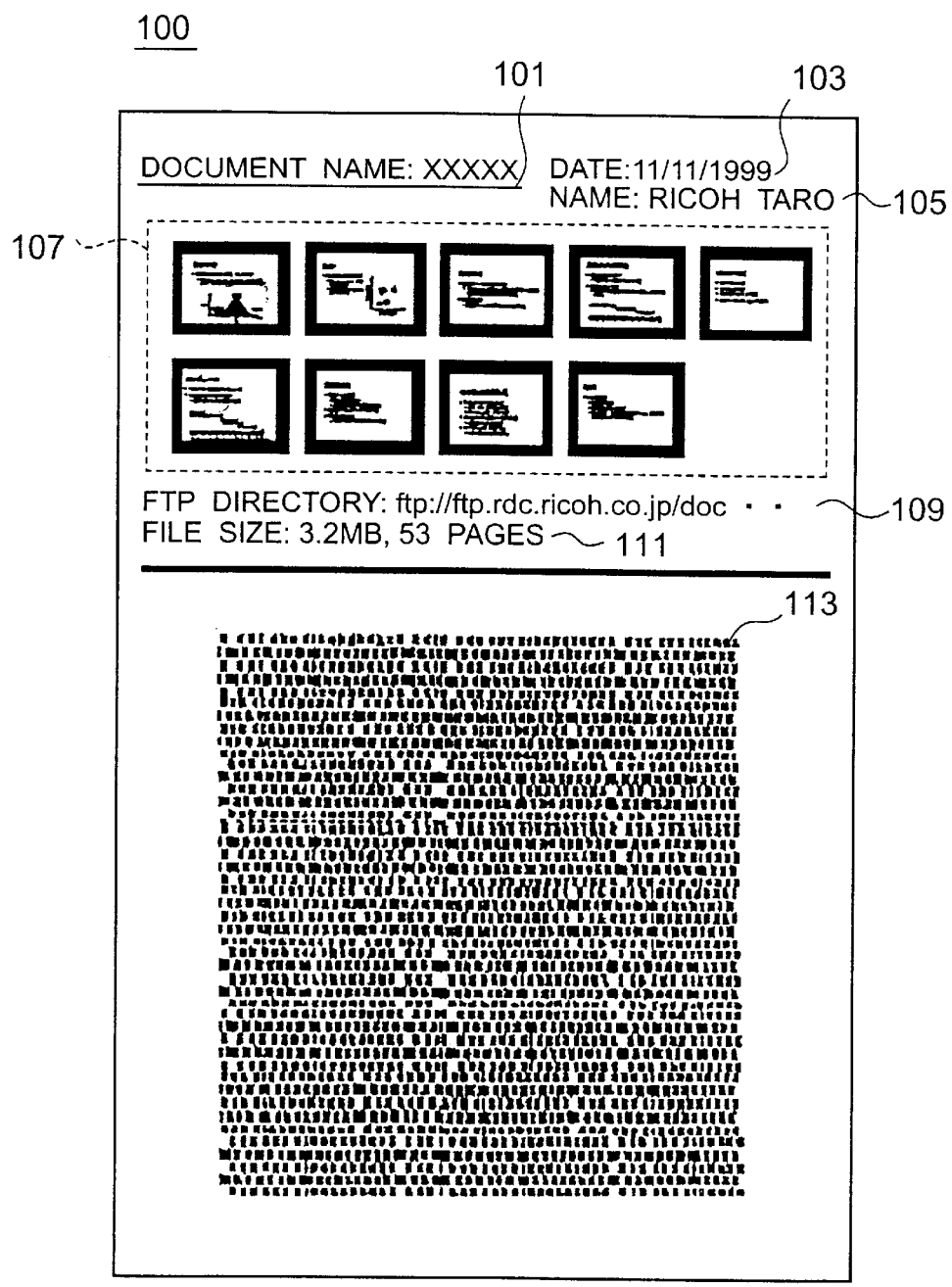
FIG. 1 is a diagram showing a printed matter according to a first embodiment of the present invention.

A description will now be given of preferred embodiments of the present invention, with reference to the accompanying drawings. It should be noted that identical unit numbers shown in the drawings indicate a same or corresponding unit.

FIG. 1 is a diagram showing a printed matter 100 according to a first embodiment of the present invention. The printed matter 100 shown in FIG. 1 includes an upper part providing an interface for a user, and a lower part providing an interface for a reading device that reads the printed matter 100. In details, the upper part of the printed matter 100 includes a file name column 101, a created date column 103, a creator name column 105, a thumbnail column 107, a file location column 109 and a file information column 111. The file name column 101 indicates a name of a file, and is expressed as "document name: xxxxx". The created date column 103 shows "date: Nov. 11, 1999", for instance. The creator name column 105 shows "name: Ricoh Taro", for instance. The thumbnail column 107 shows reduced images for previewing a document recorded in the lower part of the printed matter 100. The file location column 109 indicates a location of the file. Additionally, the file information column indicates a file size and the number of pages included in the document, for instance. The lower part of the printed matter 100 includes a coding part 113, in which all the codes obtained by encoding the entire document are recorded.

The upper part of the printed matter 100 simply needs to be expressed in a format that allows a user to understand contents of the coding part 113 printed in the lower part. Therefore, the file name column 101, the created date column 103, the creator name column 105, the file location column 109 and the file information column 111 are not necessarily printed on the printed matter 100.

In addition, other information can be printed on the printed matter 100 with the above-described information. For instance, the printed matter 100 may include notes requesting to read the printed matter 100 with a reading device that has a resolution equal to or higher than 600 dpi (dot per inch). Additionally, printed contents of the thumbnail column 107 are not limited to thumbnails. For instance, the creator of the printed matter 100 can create new sentences or figures that summarize the contents of the coding part 113, and can print the sentences or the figures in the thumbnail column 107.

Additionally, in a case of using the thumbnails, information recorded on from the first page to a predetermined page of the document may be automatically printed in the thumbnail column 107, wherein the predetermined page is the ninth page shown in the printed matter 100 according to the first embodiment, for example. Alternatively, the creator of the printed matter 100 may select the predetermined page. In any case, main information for allowing a user to understand the contents of the coding part 113 is record on the printed matter 100.

On the other hand, the lower part of the printed matter 100 is a part that provides the interface for a reading device and includes the coding part 113. Additionally, as a characteristic of the printed matter 100 according to the first embodiment, data of the entire document selected by the creator of the printed matter 100 is encoded, and is printed in the coding part 113. In other words, the entire document becomes usable without a storage device storing the document, by having the printed matter 100 and utilizing a later-described reading device with the printed matter 100. In details, the entire document becomes printable, or editable by obtaining the entire document as a file, for example.

A code used in the coding part 113 is, for instance, a glyph code that is a coding format expressing zeros and ones by use of slashes facing left and right. For instance, data whose size is between several mega bytes and scores of mega bytes can be recorded and reproduced on a single A4-size sheet by use of a printing device and a reading device whose resolutions are between 600 dpi and 1200 dpi or 2400 dpi. A capacity of data recorded on the single sheet varies according to a degree of correcting the code. Additionally, the larger capacity of data recorded on the single sheet may be achieved by compressing a file by using a fixed algorithm, and then, by printing the file based on the glyph code.

A document recorded on the printed matter 100 must be an electronic document. However, provided that the document has a data size possible to be recorded inside the coding part 114, the document can be handled regardless of its number of pages, file format, and data contents. The material of the printed matter 100 can be regular paper, coated paper, rewritable thermal sheet, plastic, or metal. In other words, the material of the printed matter 100 can be anything as long as the document is printed with fixed dot reproducibility. Additionally, a method of printing the document may utilize anything including a laser, an inkjet, a thermal method, or a thermal ribbon as long as the document is printed with fixed dot reproducibility. However, a thermal sheet that can print a document with high dot reproducibility may be necessary in a case in which large-scale data must be recorded or printed.

Information has been distributed through floppy disks, CD-ROMs, CD-Rs, CD-RWs, MOs, DVDs, and other electronic/magnetic recording mediums. However, a user often cannot understand contents of the electronic/magnetic recording mediums such as the floppy disks, just by viewing outside parts of the electronic/magnetic recording mediums. On the other hand, by using the printed matter 100 according to the first embodiment, a user can recognize what kind of data or contents are recorded on the printed matter 100 just by viewing the printed matter 100.

Additionally, since data encoded based on the entire document is printed on the printed matter 100, the entire document can be converted back to an electric file, or can be printed on a sheet, as long as a reading device is provided for reading the printed matter 100. The present invention proposes a new method of distributing information and carrying information, by providing a function for recording a large amount of data on a recording sheet such as paper, and then, by transferring the information to a user through texts expressed on paper and the like. Additionally, a device necessary for copying the printed matter 100 according to the first embodiment is only a copy machine having a resolution equal to or higher than a resolution necessary for creating a printed matter. Drive devices are generally necessary for copying data stored in electronic/magnetic recording mediums, whereas the printed matter 100 according to the first embodiment needs only the copy machine. Thus, according to the present invention, data recorded on the printed matter 100 can be easily copied.

According to the first embodiment, a user can recognize contents of a document recorded on a data sheet such as the printed matter 100 by use of a reduced image on the data sheet, and can search the contents of the document easily. Additionally, the user can easily obtain electronic data corresponding to a desired part of the document from the data sheet by selecting the reduced image. Furthermore, the data sheet is effective for maintaining secrecy, since data recorded on the data sheet is encoded so that a user cannot recognize contents of the data just by looking at the data.

Figure 2:
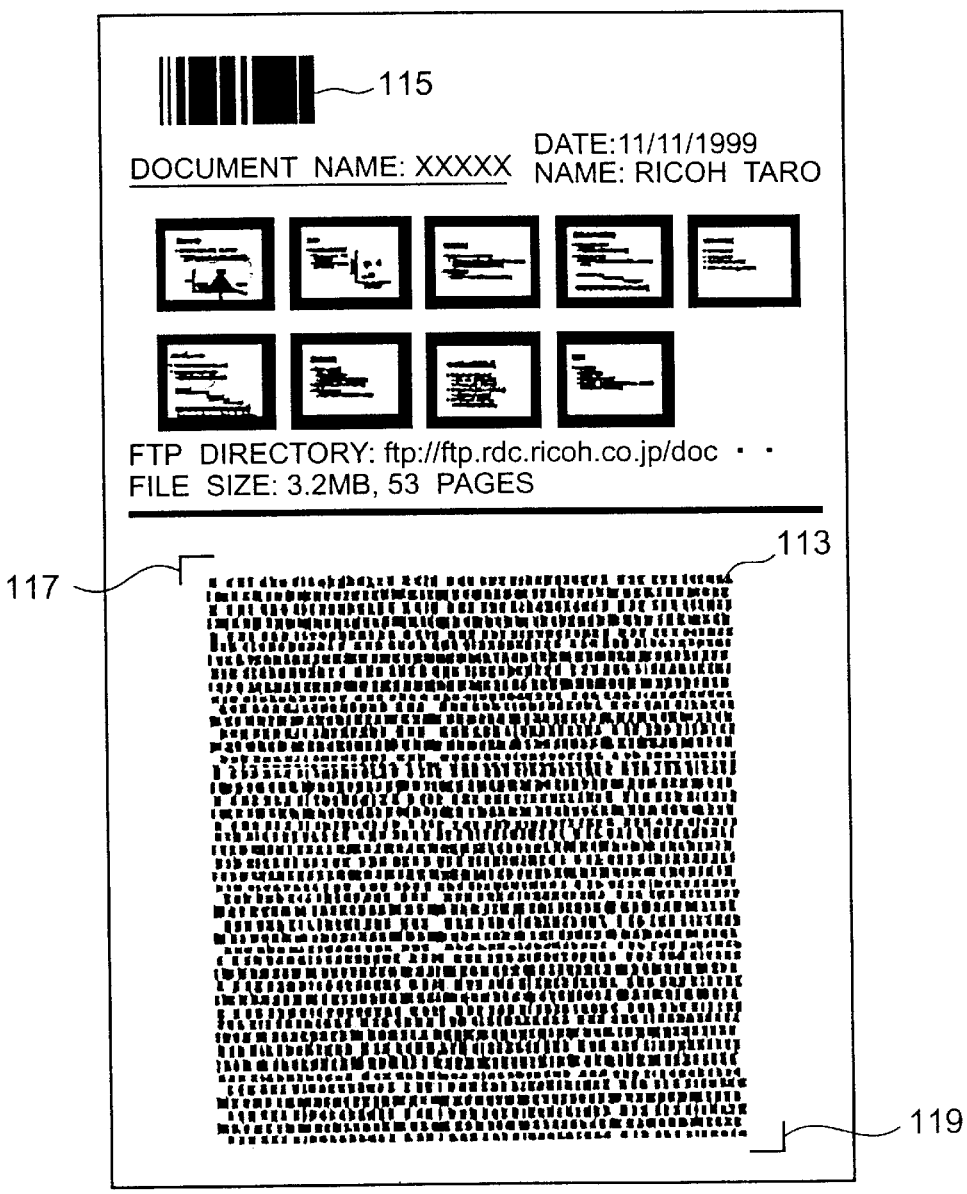
FIG. 2 is a diagram showing a printed matter, according to a second embodiment of the present invention.

FIG. 1 shows the printed matter 100 according to the first embodiment that only includes basic components. On the other hand, FIG. 2 is a diagram showing a modified version of the printed matter 100 shown in FIG. 1, according to a second embodiment of the present invention. The printed matter shown in FIG. 2 further includes a bar code 115 in an upper part thereof, a start mark 117 indicating the beginning of the coding part 113, and an end mark 119 indicating the end of the coding part 113.

The bar code 115 includes codes used by a reading device to perform processes planned by a creator of the printed matter. In details, the bar code 115 includes codes used by the reading device for confirming a password for the printed matter, permitting the printed matter only to be printed, enabling only creation of a file or only fax of the file, or letting a holder of the printed matter select a process among several processes by displaying a menu. It should be noted that the bar code 115 may include information about the password. Additionally, contents of the processes recorded in the bar code 115 can be included in the beginning or the end part of the coding part 113, for instance. Similarly, in the case of confirming the password, the information about the password may be included in the beginning or the end part of the coding part 113, for example. Additionally, a two-dimensional bar code may be applied to the bar code 115. Alternatively, codes other than a bar code may be used as the bar code 115. Additionally, the bar code 115 may be printed at any location on the printed matter. However, it is desirable that a printing location of the bar code 115 is fixed on the printed matter so that the reading device can easily recognize the existence of the bar code 115.

As described above, a creator of the printed matter can specify contents of processes that can be performed by the reading device by including instruction codes such as the bar code 115 in the printed matter.

Shapes of the start mark 117 and the end mark 119 are examples. If the start mark 117 and the end mark 119 are printed on the printed matter, the reading device can easily recognize the beginning and the end of the coding part 114, thereby increasing its processing speed.

Figure 3:
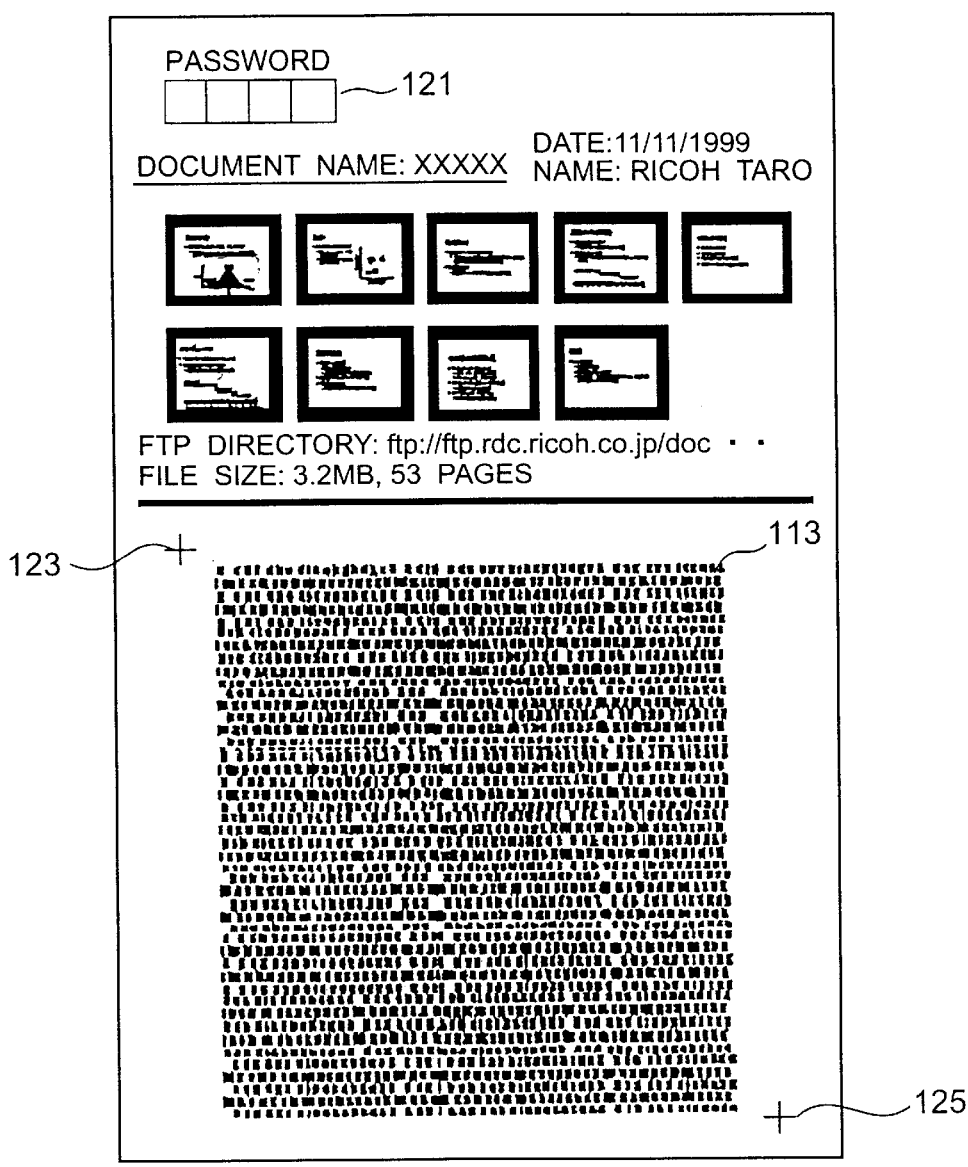
FIG. 3 is a diagram showing a printed matter, according to a third embodiment of the present invention.

FIG. 3 is a diagram showing a printed matter, according to a third embodiment of the present invention. The printed matter shown in FIG. 3 is a modified version of the printed matter 100 shown in FIG. 1, further including a security box 121 used for inputting a password, a start mark 123 of the coding part 113, and an end mark 125 of the coding part 113. For instance, information about the password is included in the beginning or the end part of the coding part 113. A holder of the printed matter writes the password in the security box 121 before letting a reading device read the information about the password. Subsequently, the reading device obtains contents (password) written by the holder in the security box 121, by a text recognition method, and collates the contents with the password recorded in the coding part 113. If the password written in the security box 121 is correct, contents of the coding part 113 is decoded, and the entire document is printed out, for instance. On the other hand, if an incorrect password in written in the security box 121, no process is performed.

A position of the security box 121 can be anywhere on the printed matter. However, it is preferred that a printing position of the security box 121 is fixed on the printed matter so that the reading device can easily recognize the existence of the security box 121.

According to the above-described third embodiment, only a person who knows a predetermined password becomes able to access the entire document recorded on the printed matter. Thus, a reading device can be designed to perform processes requested by only a regular user of the printed matter. It should be noted that a set of the start mark 123 and the end mark 125 uses marks different from a set of the start mark 117 and the end mark 119 shown in FIG. 2. Thus, the reading device can easily recognize the coding part 113.

Figure 4:
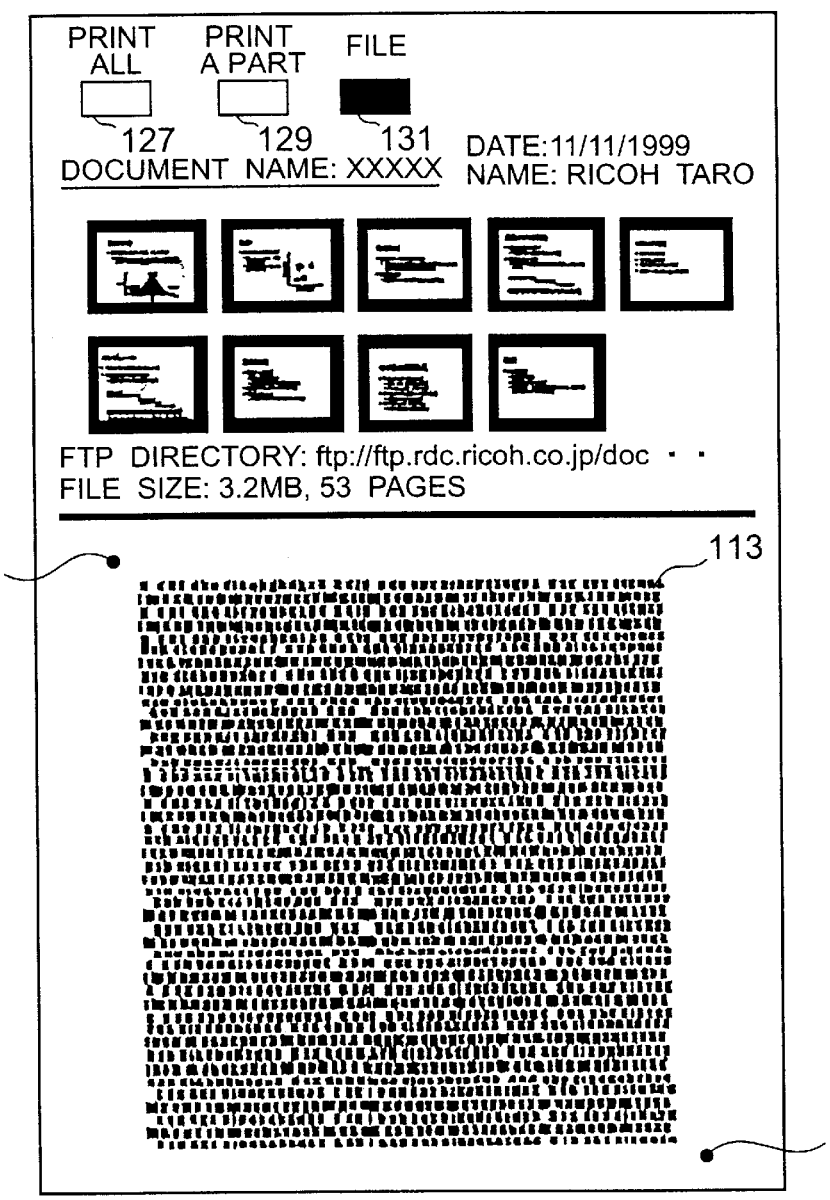
FIG. 4 is a diagram showing a printed matter, according to a fourth embodiment of the present invention.

FIG. 4 is a diagram showing a modified version of the printed matter 100 shown in FIG. 1, according to a fourth embodiment of the present invention. The printed matter shown in FIG. 4 is a modified version of the printed matter 100 shown in FIG. 1, further including check boxes 127, 129 and 131, a start mark 135 and, an end mark 137. The check box 127 is used for printing all the pages included in a document. The check box 129 is used for printing a part of the document. The check box 131 is used for storing the document as a file. Additionally, the start mark 135 and the end mark 137 indicate the beginning and the end of the coding part 113, respectively. FIG. 4 shows a case in which the check box 131 is selected for storing the file.

As shown in FIG. 4, by providing check boxes on the printed matter, a holder of the printed matter can easily specify contents of processes to be performed by a reading device. For instance, in the case in which the check box 131 is selected for storing the file, as shown in FIG. 4, the reading device requests the holder of the printed matter to input a destination of the document to be stored, by supplying a screen used for inputting the destination of the document to be stored. If the holder has specified the destination of the document to be stored, the reading device decodes the coding part 113, and stores the file obtained by decoding the document at a location corresponding to the destination of the document to be stored.

In a case in which the check box 127 is selected for printing all the pages of the document, the reading device decodes the coding part 113, and then, carries out an application program necessary for printing the document by inspecting a format of the file generated as a result of decoding the coding part 113. Subsequently, the entire document is printed by use of the application program.

Additionally, in a case in which the check box 129 is selected for printing a part of the document, the reading device requests the holder of the printed matter to input page numbers of pages to be printed by supplying a screen used for inputting the page numbers. Subsequently, the reading device decodes the coding part 113, and then, carries out an application program necessary for printing out the document by inspecting a format of the file generated as a result of decoding the coding part 113. Pages corresponding to the page numbers specified by the holder are printed by use of the application program.

Types of check boxes provided on the printed matter are not limited to the above-described three check boxes 127, 129 and 131. For instance, check boxes used for specifying other processes may be added to the printed matter. Alternatively, the number of selectable check boxes on the printed matter can be reduced. Furthermore, the printed matter can be created so that a creator of the printed matter may specify types of selectable check boxes on the printed matter.

The check boxes 127, 129 and 131 are not necessarily printed in the upper part of the printed matter, as shown in FIG. 4, and can be printed at other positions on the printed matter. However, it is preferred that printing positions of the check boxes 127, 129 and 131 are fixed on the printed matter so that the reading device can easily recognize the existence of the check boxes 127, 129 and 131. Additionally, it is preferable to fix or predetermine an order of the check boxes 127, 129 and 131 on the printed matter so as to simplify a check-box recognition process performed by the reading device. Accordingly, the holder of the printed matter can easily direct the reading device to perform processes indicated by the check boxes 127, 129 and 131.

A set of the start mark 135 and the end mark 137 of the coding part 113 shown in FIG. 4 uses marks different from the previous sets shown in FIGS. 2 and 3, and, thus, the reading device can recognize the coding part 113 easily.

In the above-described embodiments, the bar code 115, the security box 121, and a group of the check boxes 127, 129 and 131 are used separately. However, the bar code 115, the security box 121, and the group of the check boxes 127, 129 and 131 can be used together on a single printed matter.

Additionally, the above-described printed matter is not necessarily monochrome, and may be printed in colors. In the case in which the printed matter is printed in colors, data capacity of the coding part 113 increases if the reading device can recognize the coding part 113 by distinguishing one color from another. In addition, each printed matter shown in FIGS. 1, 2, 3 and 4 includes an interface unit for a user in the upper part thereof, and an interface unit for the reading device in the lower part thereof. Alternatively, the printed matter can include the interface unit for a user in the lower part, and the interface unit for the reading device in the upper part. Alternatively, the printed matter can include a left part and a right part, in which the interface unit for a user and the interface unit for the reading device are provided. Furthermore, the printed device can include the coding part 113 separated into a plurality of areas.

As described in the second, third and fourth embodiments, functionality of a data sheet such as the printed matter 100 can be increased, by including a check box, a security box, a bar code, and the like.

Figure 5A:
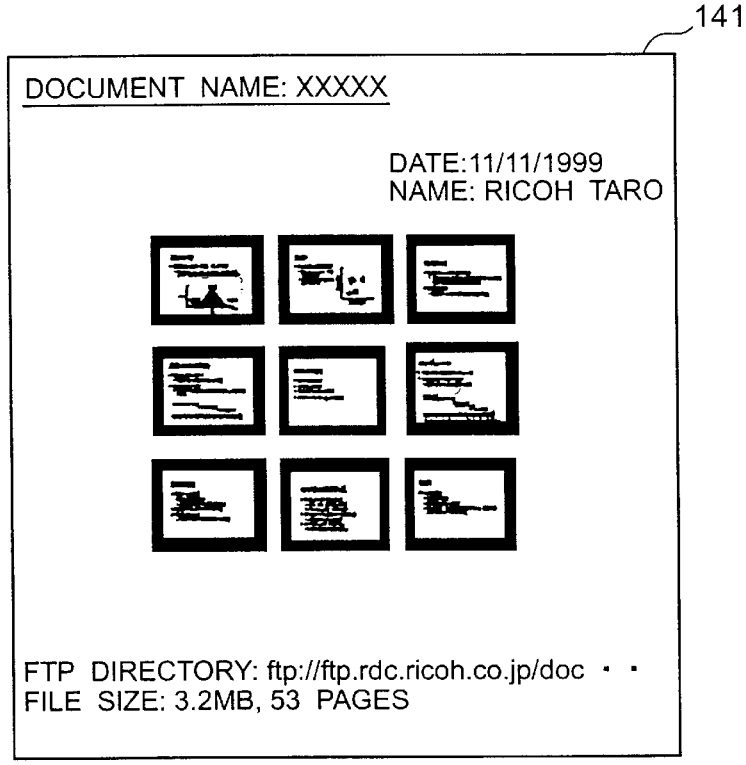
FIGS. 5A and 5B are diagrams showing a printed matter, according to a fifth embodiment of the present invention.
Figure 5B:
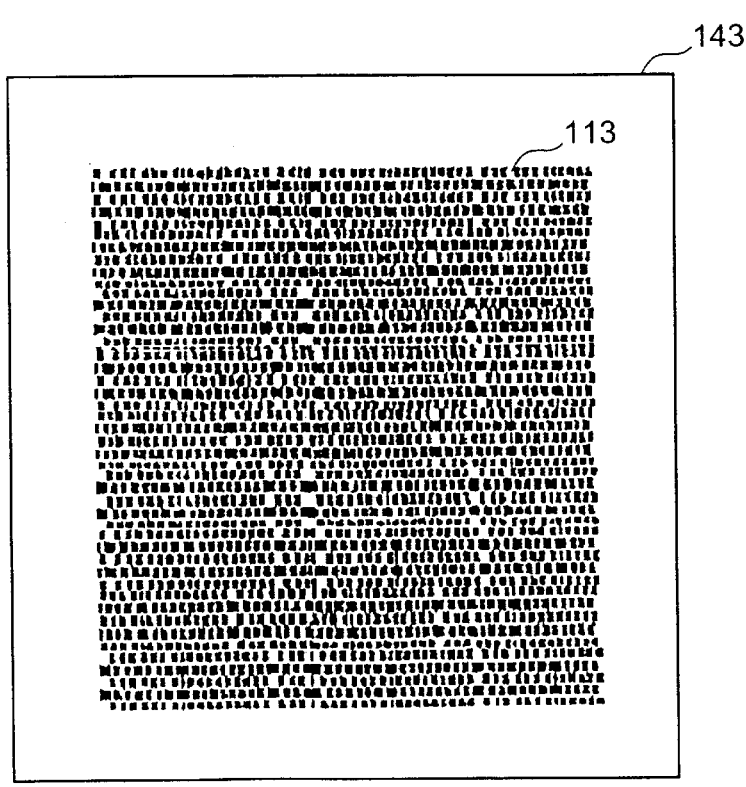

According to a fifth embodiment of the present invention, the above-described printed matter can take a format, in which information as an interface for a user is printed on a front surface 141 shown in FIG. 5A, and information as an interface for a reading device is printed on a back surface 143 shown in FIG. 5B. The reading device provided with a head used for reading information from the back surface 143 can recognize the coding part 113 without difficulty, by reading the information recorded on the entire back surface 143. Consequently, the reading device can increase a processing speed of the information read from the back surface 143. Additionally, the use of the front surface 141 and the back surface 143 of the printed matter together increases an amount of information that can be recorded on the printed matter. In the case of using both surfaces of the printed matter, information is preferably printed in a neutral color such as yellow or sepia, or a stealth printing method is preferably applied to the printed mater, so that one surface does not affect the other surface.

A description will now be given of a summary of necessary functions in a system using the above-described printed matter, according to a sixth embodiment of the present invention, with reference to FIG. 6. The system shown in FIG. 6 includes a creating/processing program 31, an image forming system 33, a code-processing program 35 and an application program 41. The creating/processing program 31 controls a process to create a printed matter, and an entire process to reproduce an electronic document from the printed matter. The image forming system 33 includes a printer 45 and a scanner 47. The code-processing program 35 includes an encoder 37 and a decoder 39.

In the above-described system, a document file 43 used for creating the printed matter 100 is inputted to the creating/processing program 31 at steps (1) and (2), and then, is encoded by the encoder 37. Subsequently, encoded information about the printed matter 100 is transmitted to the printer 45 included in the image forming system 33 at a step (3), and is printed out as the printed matter 100 from the printer 45. Additionally, the printed matter 100 is read by the scanner 47 included in the image forming system 33 at a step (4), and information read by the scanner 47 is transmitted to the decoder 39 where the information is decoded, at a step (5). Subsequently, the information decoded by the decoder 39 is transmitted by the application program 41 to the printer 45 at steps (6) and (7). As a result, documents 107a and 107b included in the document file 43 are outputted from the printer 45. It should be noted that a data flow in the above-described steps is shown as arrows in FIG. 6.

Figure 6:
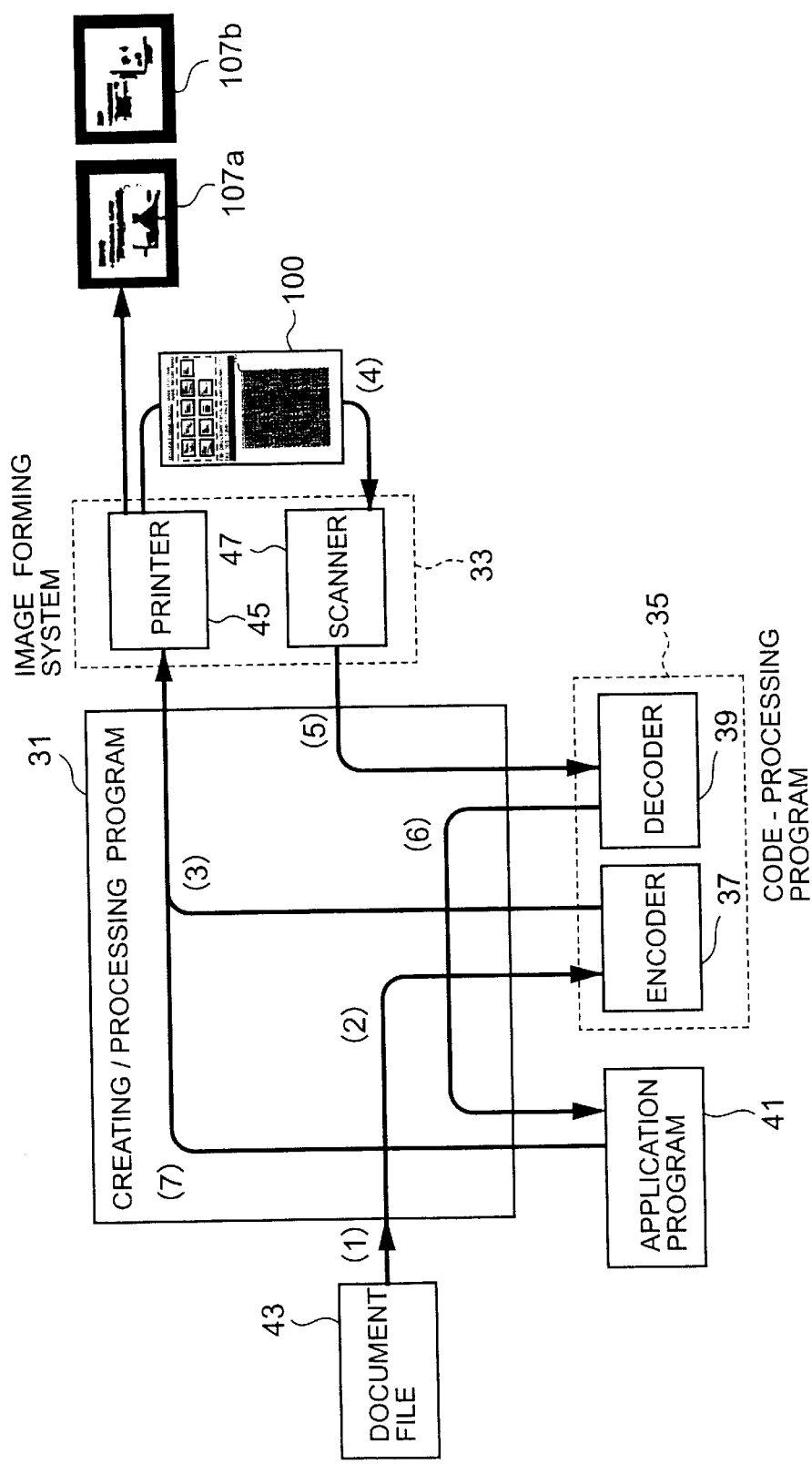
FIG. 6 is a block diagram showing functions of a system processing a printed matter, according to a sixth embodiment of the present invention.
Figure 7:
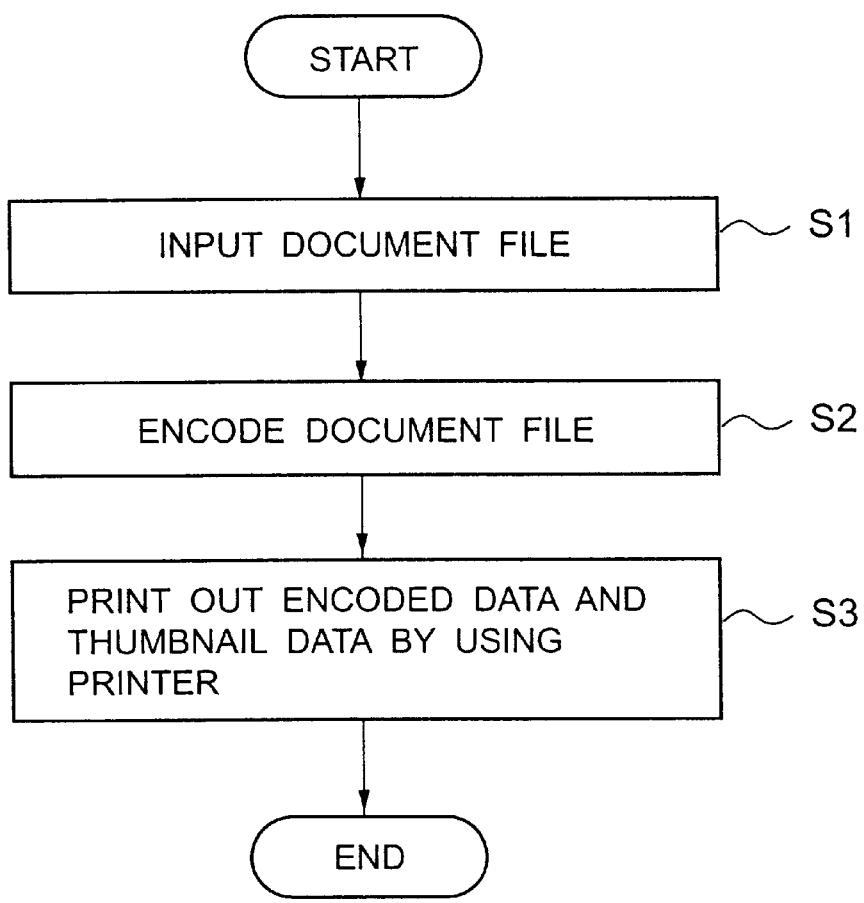
FIG. 7 is a flowchart showing a process performed by the system shown in FIG. 6 to create the printed matter.

FIG. 7 is a flowchart showing a process performed by the system shown in FIG. 6 to create a printed matter. At a step S1 shown in FIG. 7, the document file 43 such as an MS-Word (a registered trademark) document, that is, to be record on the printed matter 100, is inputted to the creating/processing program 31. The document file 43 may include a plurality of files. At a step S2, the encoder 37 of the code-processing program 35 encodes the document file 43. Subsequently, at a step S3, the printer 45 included in the image forming system 33 prints encoded data obtained from the encoder 37 and thumbnail data. Consequently, the system shown in FIG. 6 creates the printed matter 100 by taking the above-described steps. A part where the thumbnail data is recorded, such as the thumbnail column 107 may include texts or images other than thumbnails, which indicate contents of the document understood by a user.

Figure 8:
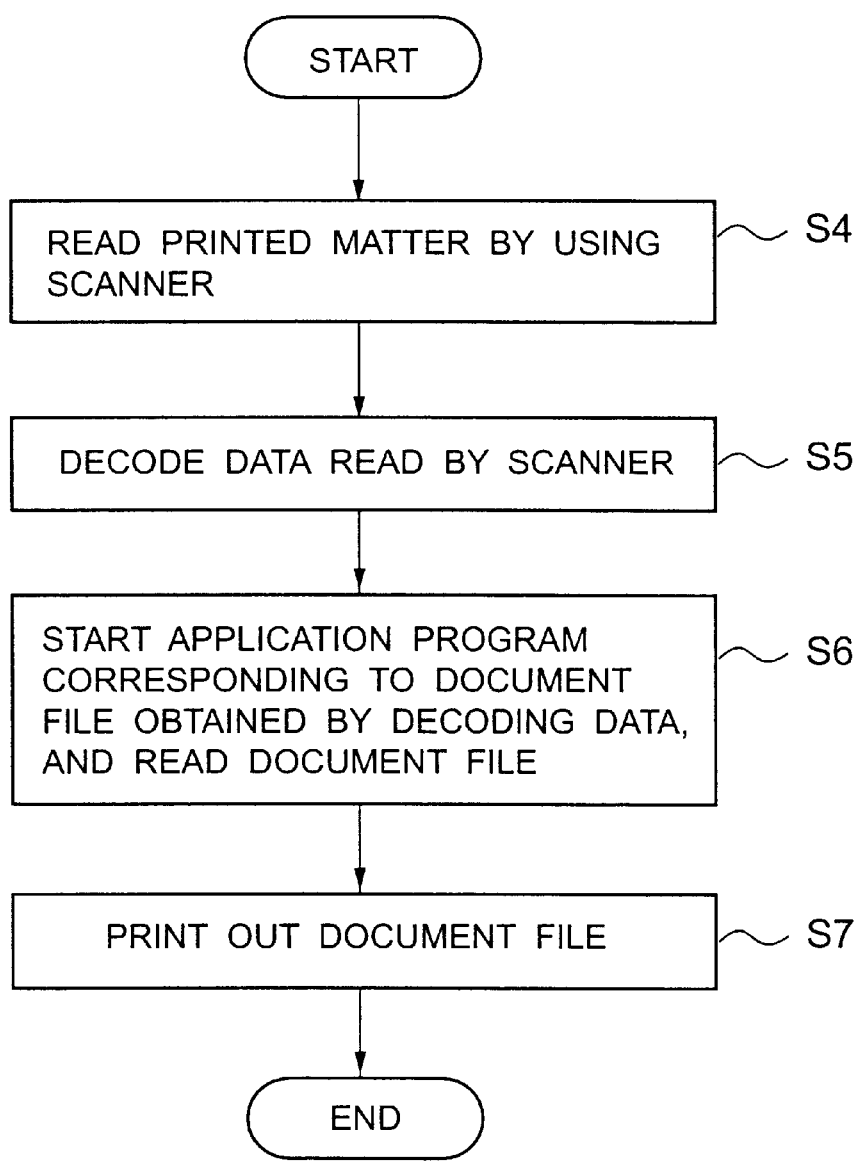
FIG. 8 is a flowchart showing a process performed by the system shown in FIG. 6 to reproduce an electronic document from the printed matter.

FIG. 8 is a flowchart showing a process performed by the system shown in FIG. 6 to reproduce an electronic document from the printed matter 100. At a step S4 shown in FIG. 8, the scanner 37 of the image forming system 33 reads the printed matter 100. Information (data) read by the scanner 37 is stored in a TIFF format, for example. Subsequently, at a step S5, the decoder 39 included in the code-processing program 35 decodes the data read by the scanner 37, thereby reproducing the document file 43. At a step S6, the system shown in FIG. 6 starts up the application program 41 corresponding to the document file 43 obtained as a result of decoding the data, and reads the document file 43 onto the application program 41. The application program 41 is the MS-Word program, for instance. Subsequently, at a step S7, the application program 41 transmits the document file 43 to the printer 45 of the image forming system 33, and prints out the document file 43. Consequently, the documents 107a and 107b are printed out from the printer 45. In a case in which the code-processing program 35 is implemented in hardware, the code-processing program 35 can encode or decode at a higher speed than a case in which the code-processing program 35 is implemented in software.

A description will now be given of a system processing the printed matter, according to a seventh embodiment of the present invention, with reference to FIG. 9. The system shown in FIG. 9 includes a computer 1, a copy machine 5 and a copy machine 21. The computer 1 is connected to the copy machine 21 functioning as a printer as well as the image forming system 33 shown in FIG. 6. The computer 1 includes a storage device 1001 storing a creating program to print the printed matter 100. The copy machine 5 functions as a scanner as well as the image forming system 33, and includes a storage device 51 storing a processing program used for processing the printed matter 100 and various types of application programs processing a decoded file.

The copy machine 5 has a scanner function to read the printed matter 100 optically, and a printer function. The copy machine 5 may further include a facsimile function. The storage device 1001 further includes the encoder 37 encoding a document file. However, the storage device 1001 and the encoder 37 may have different compositions. Additionally, the storage device 51 further includes the decoder 39 decoding the coding part included in a printed matter. However, the storage device 51 and the decoder 39 may have different compositions.

Figure 9:
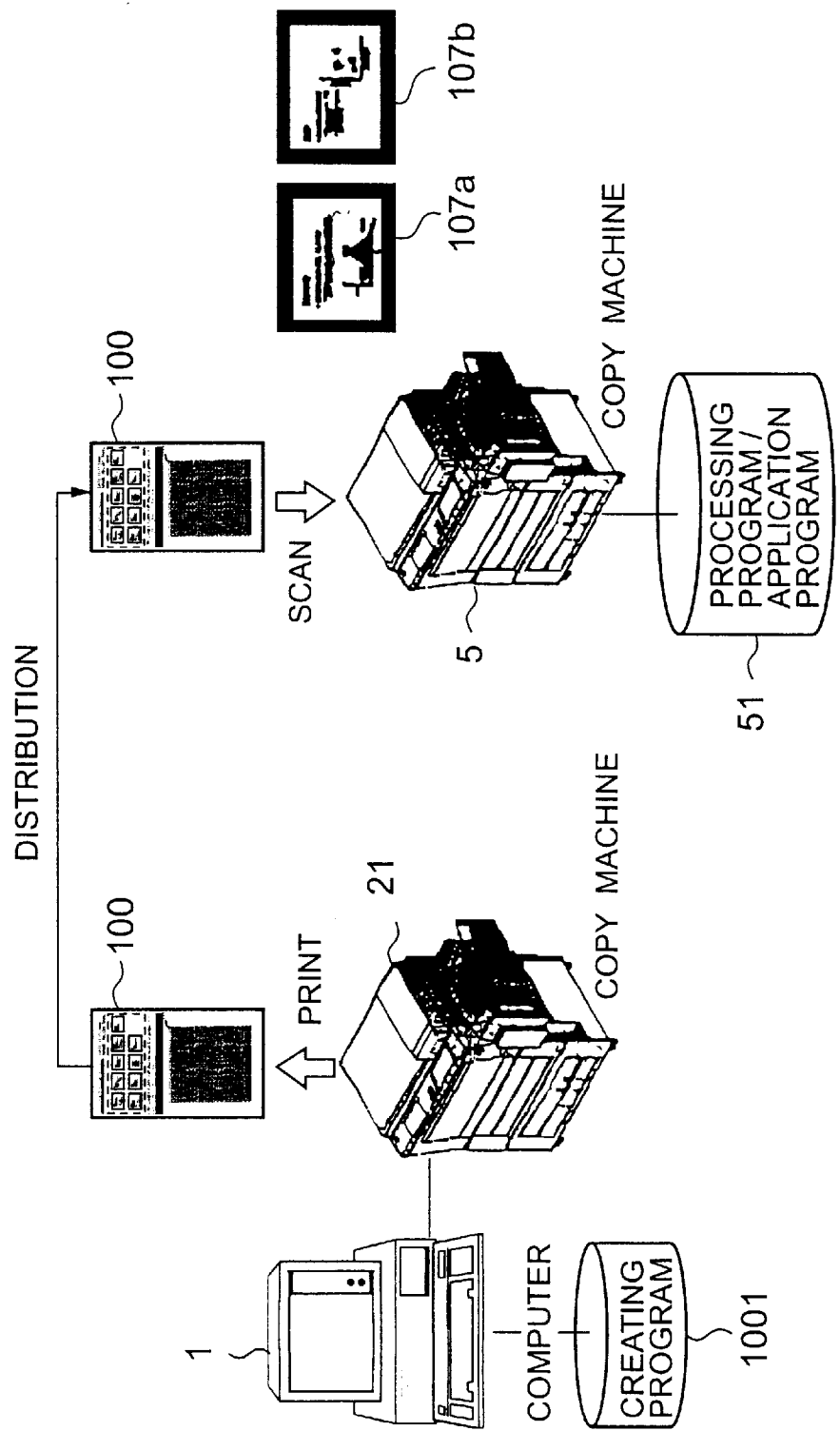
FIG. 9 is a diagram showing a system processing the printed matter, according to a seventh embodiment of the present invention.

The computer 1 shown in FIG. 9 encodes a document file by carrying out the creating program stored in the storage device 1001, and prints out the printed matter 100 by use of a printer. The printed matter 100 created by such a method can be distributed as it is, or can be copied by a copy machine having a higher resolution than the printer, and then distributed.

A holder of the printed matter 100 scans the printed matter 100 by use of the copy machine 5 in a case of printing contents of the printed matter 100. Accordingly, the code-processing program 35 (the decoder 39) stored in the storage device 51 of the copy machine 5 decodes the coding part of the printed matter 100. The decoded coding part is stored temporarily in the storage device 51 as a file. The processing program of the creating/processing program 31 inspects a format of the file. Subsequently, the copy machine 5 executes the application program 41 corresponding to the format of the file, and prints out contents of the file. As a result, the documents 107a and 107b are outputted from the copy machine 5, for instance.

A description will now be given of another system processing the printed matter, according to an eighth embodiment of the present invention, with reference to FIG. 10. The computer 1 is connected to a printer 3, and has the storage device 1001 storing the creating program used for printing the printed matter 100. The copy machine 5 as a reading device has the storage device 51 storing the processing program used for processing the printed matter 100 and the various application programs processing a decoded file. Additionally, the copy machine 5 has a scanner function reading the printed matter 100 optically, and a printer function. The copy machine 5 may further have a facsimile function. In the eighth embodiment, the copy machine 5 is connected to a network 7, to which a printer 9, a server 11 and a computer 13 are connected. The server 11 has a storage device 1101 storing various application programs. The computer 13 is connected to a printer 1303 and a scanner 1301.

A description will now be given of operations performed by the system shown in FIG. 10. The computer 1 prints out the printed matter 100 by using the printer 3, by carrying out the creating program stored in the storage device 1001. The printed matter 100 printed out by the above-described method can be distributed as it is. Alternatively, the printed matter 100 can be copied by a copy machine having a resolution higher than that of the printer 3, and then, distributed.

A holder of the printed matter 100 scans the printed matter 100 by use of the copy machine 5 and the like, in a case of printing contents of the printed matter 100, or extracting the contents as a file. Accordingly, the code-processing program 35 (the decoder 39) stored in the storage device 51 of the copy machine 5 decodes the coding part of the printed matter 100. The decoded coding part is stored temporarily in the storage device 51 as a file. Then, for example, the processing program of the creating/processing program 31 inspects a format of the file. Subsequently, the copy machine 5 executes the application program 41 corresponding to the format of the file, and prints out contents of the file. As a result, the documents 107a and 107b are outputted from the copy machine 5, for instance.

Another processing method can be performed on electronic information, which is the file stored in the storage device 51. In details, based on an instruction from the holder of the printed matter 100, the file temporarily stored in the storage device 51 of the copy machine 5 is transmitted to the specified computer 13 through the network 7. Subsequently, the computer 13 carries out an application program corresponding to the format of the file, and prints the file by use of the printer 9 or the printer 1303. Meanwhile, the application program corresponding to the format of the file may edit or modify an electronic document included in the file.

Yet, another processing method can be performed on the electronic information. In details, the copy machine 5 transmits the file temporarily stored in the storage device 51 to the printer 9 connected to the network 7, and prints out the file by use of the printer 9, by carrying out the application program 41 corresponding to the format of the file based on an instruction from the holder of the printed matter 100.

Yet, another method of processing the electronic information may be instructed by the holder of the printed matter 100 to transmit the file temporarily stored in the storage device 51 from the copy machine 5 through the network 7 to the server 11, which prints out the file by use of the printer 9 connected to the network 7 by carrying out an application program corresponding to the format of the file. The server 11 may take a method of creating printing data by carrying out the application program corresponding to the format of the file, transmitting the printing data to the copy machine 5, and printing out the printing data by use of the copy machine 5.

Additionally, in a case in which the storage device 51 of the copy machine 5 does not store application programs, the copy machine 5 inspects a format of the file stored in the storage device 51 by carrying out the processing program installed in the copy machine 5, and requests the server 11 for an application program corresponding to the format of the file. In response, the server 11 takes out the requested application program from the storage device 1101, and transmits the application program to the copy machine 5. Subsequently, the copy machine 5 prints out the file stored in the storage device 51 by carrying out the application program received from the server 11.

Figure 10:
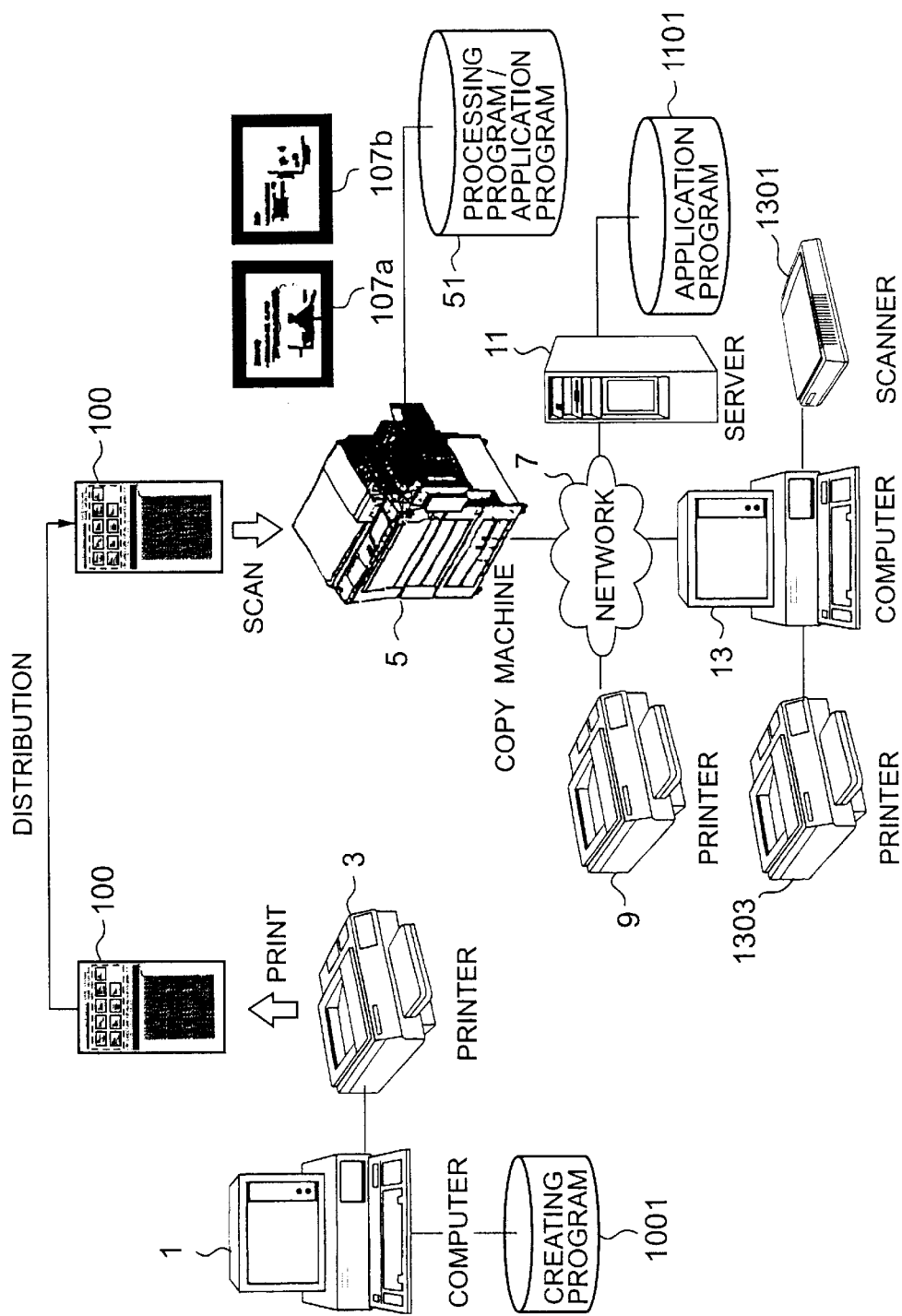
FIG. 10 is a diagram showing another system processing the printed matter, according to an eighth embodiment of the present invention.

In the system shown in FIG. 10, devices other than the copy machine 5 may process the printed matter 100. For instance, the scanner 1301 connected to the computer 13 optically reads the printed matter 100, and transfers the printed matter 100 to the computer 13. The computer 13 decodes the coding part of the printed matter 100, by using a processing program stored in a storage device not shown in the figures, and then, once stores the decoded coding part as a file in the storage device not shown in the figures. Subsequently, the computer 13 inspects a format of the file by carrying out the processing program, and creates printing data used for printing the file by carrying out an application program corresponding to the format of the file. The printing data created as describe above is printed out by the printer 1303, for instance. Alternatively, the printing data may be transmitted to the printer 9 connected to the network 7, and may be printed out by the printer 9. Additionally, the file temporarily stored in the storage device not shown in the figures may be transmitted to the server 11 through the network 7.

In the above description about the system shown in FIG. 10, it is understood that the coding part of the printed matter 100 is decoded by the processing program. However, the copy machine 5 may convert the coding part of the printed matter 100 to digital data instead of decoding the coding part, by executing the processing program. In other words, the copy machine 5 can be designed not to create a document file, that is, a basis for creating the printed matter 100, and not to perform processes to add an error correction code used for printing the document file and to decompress the document file. In such a case, a program (a decoder program) used for decoding the digital data is provided in the storage device of the server 11. The copy machine 5 transmits the digital data to the server 11. After receiving the digital data from the copy machine 5, the server 11 decodes the digital data by executing the decoder program. The server 11 may return a decoding result to the copy machine 5. Additionally, the server 11 may transmit the decoding result to the copy machine 5 or the printer 9, and may print the decoding result by use of the copy machine 5 or the printer 9, by carrying out an application program. Furthermore, the server 11 may transmit the decoding result to the computer 13.

A description will now be given of a process performed by the computer 1 included in the system shown in FIG. 10, according to a ninth embodiment of the present invention, with reference to FIG. 11.

The computer 1 initially displays, on a monitor thereof, an input screen used by a creator (a user) of a printed matter for specifying a file as an object of printing, at a step S11. The user can specify not only one but also a plurality of files on the input screen, since there is a case in which a document is composed of a plurality of files. Additionally, the input screen is set so that the user can specify a plurality of files consisting more than one document. Additionally, before performing below steps, a process may be performed to inspect a file specified by the creator of the printed matter (the user). For instance, in a case in which the specified file is for read only, or a property such as a hidden file is attached to the specified file, the computer 1 decides whether execution of the below steps or processes is acceptable, by inspecting the property.

After the user specifies a file at the step S11, the computer 1 displays a screen on the monitor, asking the user whether to specify or not to specify pages that are to be printed in the thumbnail column 107, at a step S12. If the user inputs to the computer 1, a response to specify the pages to be printed in the thumbnail column 107, the computer 1 lets the user input page numbers of the pages, at a step S13. The pages to be printed in the thumbnail column 107 are stored in a memory or the like. Alternatively, the memory may store a specification to print predetermined first several pages of the file in the thumbnail column 107, where the specification is automatically set at a step S14 if the user answers not to specify the pages to be printed in the thumbnail column 107 at the step S12.

Subsequently, at a step S15, the computer 1 displays a screen on the monitor, asking the user whether to provide a check box or not on the printed matter. If the user responds to the computer 1 to provide the check box on the printed matter, the computer 1 displays a screen used by the user for specifying a type of the check box, at a step S16. The type of the check box specified by the user is stored in the memory or the like. The check box is used for identifying contents of processes, which the creator (the user) of the printed matter permits a holder of the printed matter to perform. On the other hand, if the user inputs a response not to use the check box to the computer 1 at the step S15, the computer 1 proceeds to a step S17.

At the step S17, the computer 1 displays a screen asking the user whether a password is necessary on the printed matter. If the user inputs a response that the password is necessary, the computer 1 lets the user input the password at a step S18. The password inputted by the user is stored in the memory or the like. If the user inputs a response that the password is unnecessary, the computer 1 proceeds to a step S19.

At the step S19, the computer 1 displays a screen asking the user whether to use a security box or not. If the user inputs a response to use the security box at the step S19, the computer 1 specifies the use of the security box at a step S20. The response to use the security box is stored in the memory or the like. On the other hand, if the user inputs a response not to use the security box at the step S19, the computer 1 proceeds to a step S21.

At the step S21, the computer 1 displays a screen asking the user whether to use a control code or not. The control code is the bar code 115 and the like, and may be included in the beginning or the end area of the coding part 113. If the user inputs a response to use the control code at the step S21, the computer 1 displays a screen used by the user for specifying contents of a process indicated by the control code, at a step S22. The contents of the process includes, for instance, a process to print all the pages of the document, a process to print a part of the document, a process to store or to transmit and store the file, a process to allow the user to select one of the above-described processes, and a process to inspect a password. Such contents of the processes are stored in the memory or the like. On the other hand, if the user inputs a response not to use the control code at the step S21, the computer 1 proceeds to a step S23.

Figure 11:
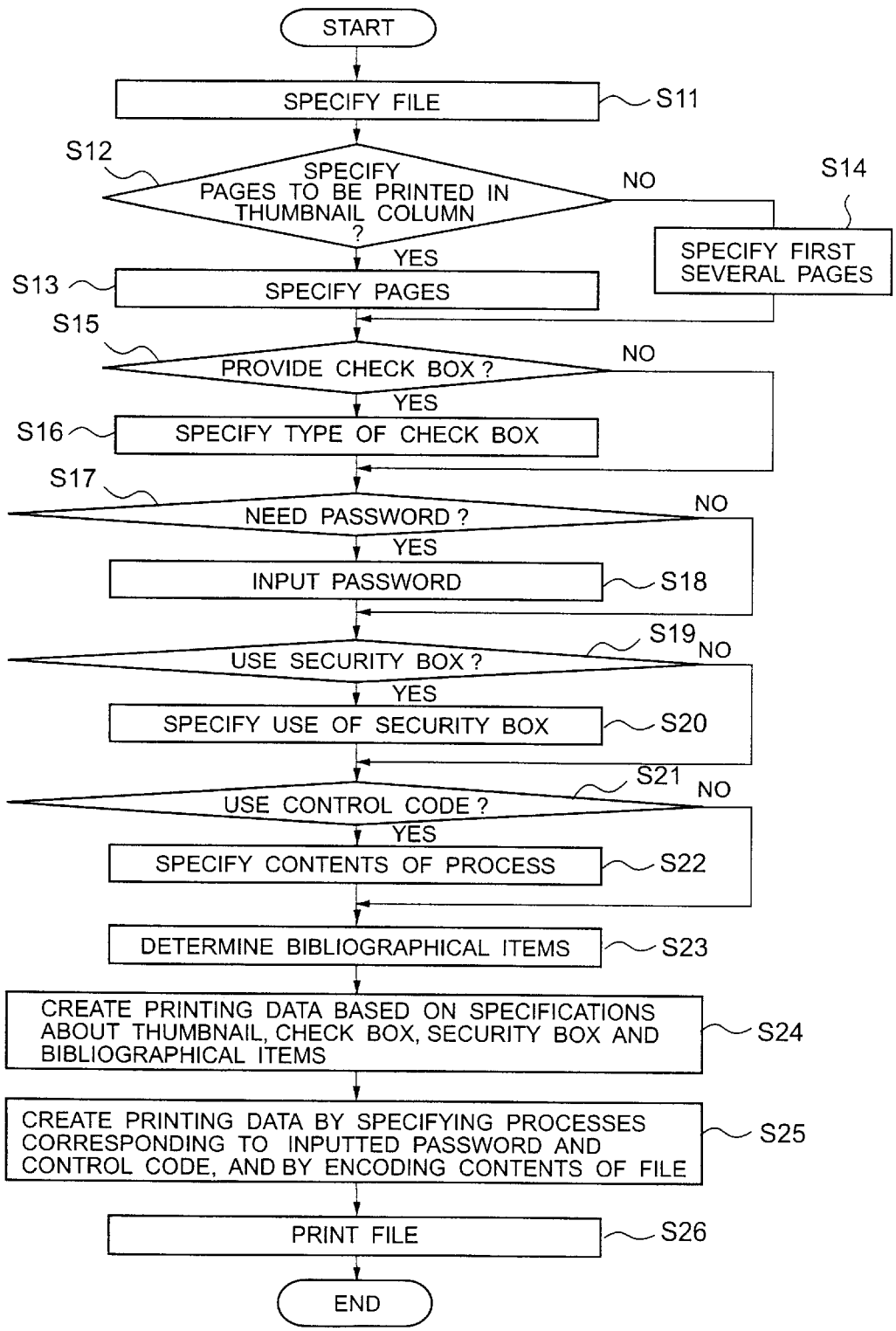
FIG. 11 is a flowchart showing a process to print the printed matter, according to a ninth embodiment of the present invention.

In a case in which the specification of the security box or the control code is not executed, but the specification of the password is executed, the computer 1 needs to request the user to specify a process not shown in FIG. 11 to handle the password. However, the computer 1 does not need the security box or the control code, if a reading device is set to execute a security check by default.

At the step S23, the computer 1 displays a screen asking the user to determine bibliographical items. Contents of the determined bibliographical items are stored in the memory or the like. The bibliographical items include a created date, a creator's name, a title, a location to be stored, a file size, the number of pages, resolution for printing, and the like. Subsequently, at a step S24, the computer 1 creates printing data based on the specifications about the thumbnail column 107, the check box, the security box and the bibliographical items, which are stored in the memory. Additionally, at a step S25, the computer 1 creates printing data by specifying processes corresponding to the password and the control code stored in the memory, and by encoding the contents of the file. A code type used for encoding the contents of the processes specified by the password and the control code stored in the memory and a code type used for encoding the contents of the file can be changed, equalized, or partially equalized.

Subsequently, at a step S26, a printer prints the file based on the printing data created by the computer 1 at the steps S24 and S25. Consequently, the printed matter 100 is created.

A format of the file specified by the user at the step S11 can be a file format with a tag. In the case of using the file format with a tag, the computer 1 creates the printing data by interpreting the tag with the creating program stored in the storage device 1001, the tag including the specifications about the check box, the security box, the control code, the password, and the like. In other words, the user specifies the check box and the like to the file instead of the creating program.

A description will now be given of a process performed by the copy machine 5 or the computer 13, according to a tenth embodiment of the present invention, with reference to FIG. 12. For a description purpose, the copy machine 5 and the computer 13 are referred to as a computer, in the tenth embodiment.

The computer initially reads the printed matter 100 optically, and analyzes contents of the printed matter 100, at a step S31. Subsequently, the computer decides whether a security box exists on the printed matter 100 based on a result of the analysis, at a step S32. If it is determined at the step S32 that the security box does not exist on the printed matter 100, the computer proceeds to a step S35. On the other hand, if it is determined at the step S32 that the security box exists on the printed matter 100, the computer decodes a printed password code, at a step S33. The printed password code is placed in the bar code 115, the beginning area of the coding part 113, or the end area of the coding part 113. Subsequently, at a step S34, the computer decides whether a password written in the security box and the decoded password code are the same. The password written in the security box can be obtained by the computer performing a text recognition process during the analysis of the contents of the printed matter 100 at the step S31.

If it is determined at the step S34 that the password written in the security box is incorrect, the computer notifies a user about the incorrect password by displaying that the computer cannot process the printed matter 100, on a monitor thereof, at a step S43. On the other hand, if it is determined at the step S34 that the password written in the security box is correct, the computer proceeds to the step S35.

At the step S35, the computer decides whether the printed matter 100 includes a control code. The control code is printed in a format of the bar code 115, or is printed in the beginning or the end area of the coding part 113. Such a control code is decoded, and the computer decides whether the control code specifies a password check at a step S36. If it is determined at the step S36 that the control code does not specify the password check, the computer proceeds to a step S40.

On the other hand, if it is determined at the step S36 that the control code specifies the password check, the computer decodes the printed password code at a step S37, and displays a screen asking the user to input a password at a step S38. The printed password code is included in the bar code 115, the beginning area of the coding part 113, or the end area of the coding part 113, as described above. Subsequently, at a step S39, the computer decides whether the decoded password code and the password inputted by the user at the step S38 are the same. If it is determined at the step S39 that the decoded password code and the password inputted by the user are not the same, the computer proceeds to the step S43, and notifies the user that the computer cannot process the printed matter 100.

On the other hand, if it is determined at the step S39 that the decoded password code and the password inputted by the user are the same, the computer proceeds to the step S40. At the step S40, the computer displays a screen including contents of processes permitted by the control code. If the user is allowed to select the contents, the user selects the contents. Subsequently, at a step S41, the computer decodes an encoded area of a document (the printed matter 100) including the coding part 113. At a step S42, the computer performs the contents of the processes selected by the user at the step S40 The contents of the processes selected by the user include a process of transmitting a file, printing the file, or transmitting the file by use of a facsimile. A detailed description of the step S42 will be given later.

If it is determined at the step S35 that the printed matter 100 does not include the control code, the computer proceeds to a step S44, and decides whether the printed matter 100 includes a check box. If it is determined at the step S44 that the printed matter 100 includes the check box, the computer proceeds to the step S41, and decodes the encoded area of the document. Subsequently, the computer performs contents of processes selected by the check box at the step S42.

If it is determined at the step S44 that the printed matter 100 does not include the check box, the computer decodes the encoded area of the document at a step S45, and carries out an application program corresponding to a file format of the document at a step S46. Subsequently, at a step S47, the computer prints out the document by use of the application program carried out at the step S46. By taking the step S42, S43 or S47, the copy machine 5 or the computer 13 finishes the above-described processes.

A detailed description will now be given of execution of selected processes at the step S42 shown in FIG. 12, with reference to FIG. 13. At a step S51, the computer, that is, the copy machine 5 or the computer 13, decides whether a process selected at the step S40 shown in FIG. 12 is to transmit a file. If it is determined at the step S51 that the process of transmitting the file is selected, the computer proceeds to a step S58, and requests a user to input a destination of the file by displaying a screen used for inputting the destination. Subsequently, at a step S59, the computer transmits the file to the destination inputted by the user.

If it is determined at the step S51 that the process of transmitting the file is not selected, the computer proceeds to a step S52, and decides whether a process of printing out all the pages of a document included in the file is selected. If it is determined at the step S52 that the process of printing out all the pages of the document is selected, the computer inspects a file format of the document, and carries out an application program corresponding to the file format at a step S60. Subsequently, at a step S61, the computer prints out all the pages of the document.

If it is determined at the step S52 that the process of printing out all the pages of the document is not selected, the computer proceeds to a step S53, and decides whether a process of printing out a part of the document is selected. If it is determined at the step S53 that the process of printing the part of the document is selected, the computer inspects a file format of the document, and caries out an application program corresponding to the file format at a step S54. Subsequently, at a step S55, the computer displays thumbnails and a screen requesting the user to select a page or a plurality of pages to be printed. Alternatively, the computer may just print a screen requesting the user to input page numbers of pages to be printed, instead of displaying the thumbnails. Accordingly, the user specifies the pages to be printed. The computer, then, prints out the specified pages at a step S56.

On the other hand, if it is determined at the step S53 that the process of printing the part of the document is not selected, the computer stores the file including the document therein (the copy machine 5 or the computer 13), at a step S57. Instead, the computer may alert the user, or may execute other processes if necessary.

The description has been given of the printed matter 100 and the system using the printed matter 100. However, the printed matter 100 and the system using the printed matter 100 are not limited to the specially disclosed embodiments and variations, and modifications may be made to the printed matter 100 and the system using the printed matter 100. For instance, the process shown in FIG. 11 is performed on the assumption that the thumbnails are to be printed on the printed matter 100. However, the process may include a step of letting the user decide whether to print or not to print the thumbnails on the printed matter 100. If the user selects not to print the thumbnails, the computer 1 may display a column on the monitor, where the user inputs a summary of the document in texts. In such a case, the computer 1 prints out the texts instead of the thumbnails, on the printed matter 100.

Alternatively, the computer 1 may execute a program automatically creating a summary of the document, and may print out the summary created by the program on the printed matter 100.

Additionally, in the process shown in FIG. 11, the computer 1 prints out the printed matter 100 in accordance with all of the check box, the security box, and the control code. However, the computer 1 may print the printed matter 100 in accordance with a part of the check box, the security box, and the control code.

Additionally, the computer 1 can execute a password check by use of the security box and the control code in the process shown in FIG. 11. However, the computer 1 may execute the password check by use of either of the security box and the control code.

Additionally, in the process shown in FIG. 11, the bibliographical items may include supplementary information such as notes about handling of the printed matter 100 and contact information, or specifications about a start mark and an end mark of the coding part 113.

Figure 12:
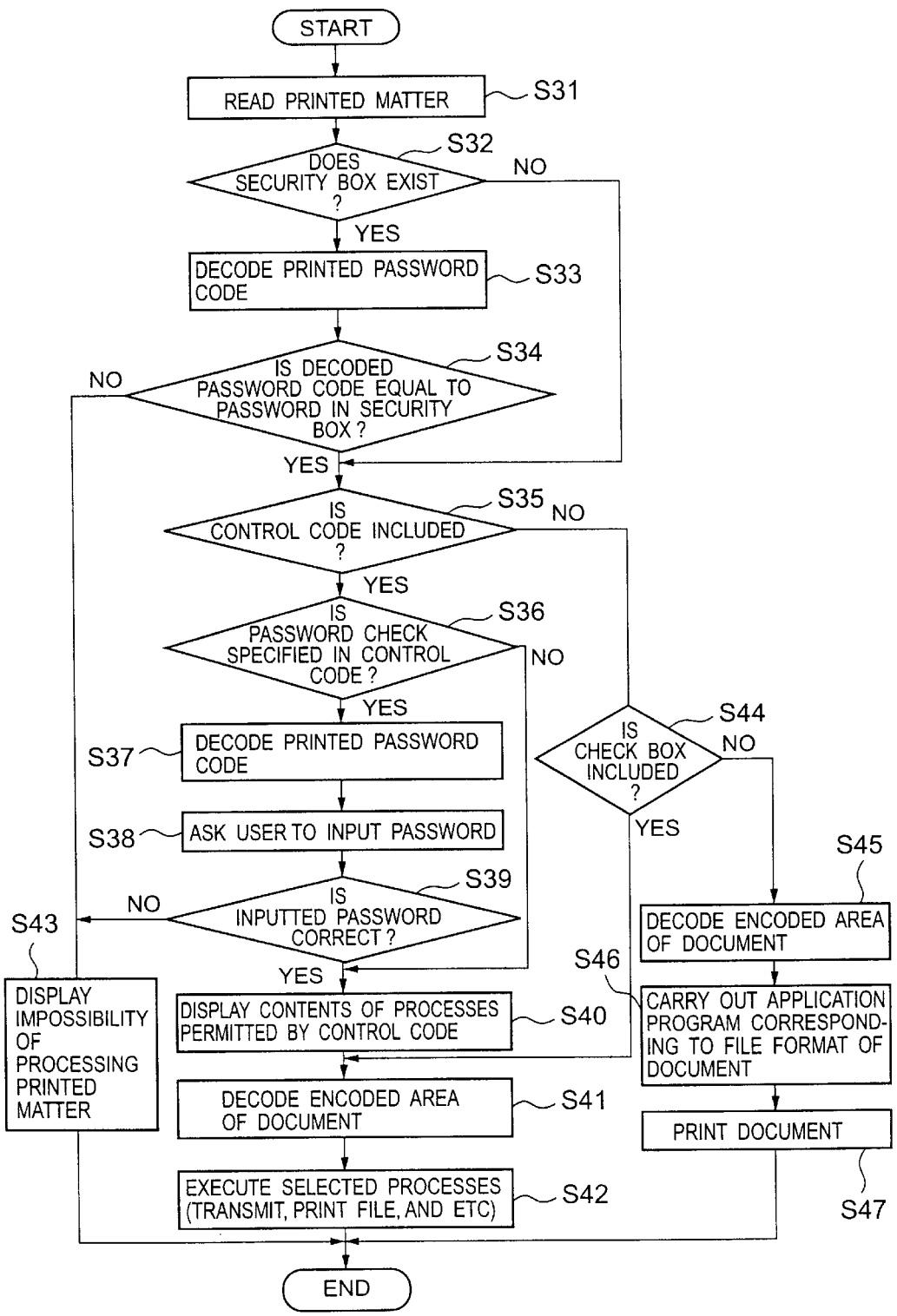
FIG. 12 is a flowchart showing a process to read data from the printed matter, according to a tenth embodiment of the present invention.

In the process shown in FIG. 12, the computer, that is, the copy machine 5 or the computer 13, is set to print the document if the printed matter 100 does not include the check box. Instead, the computer may just store the file in a storage device if the printed matter 100 does not include the check box. Further, the computer may allow the user to select a process among all the performable processes by use of an operation panel included in the copy machine 5 and the like, if the printed matter 100 does not include the check box. Additionally, even if it is determined that the printed matter 100 includes the check box, there is a case in which the user forgets to mark the check box. Accordingly, if it is determined that there is an unmarked check box, the computer may request the user to select a process performed by the computer by use of the operation panel.

Additionally, if the password inputted by the user is incorrect in the process shown in FIG. 12, the computer may request the user to input a new password by use of the operation panel, in addition to display the notification that the computer cannot process the printed matter 100.

Figure 13:
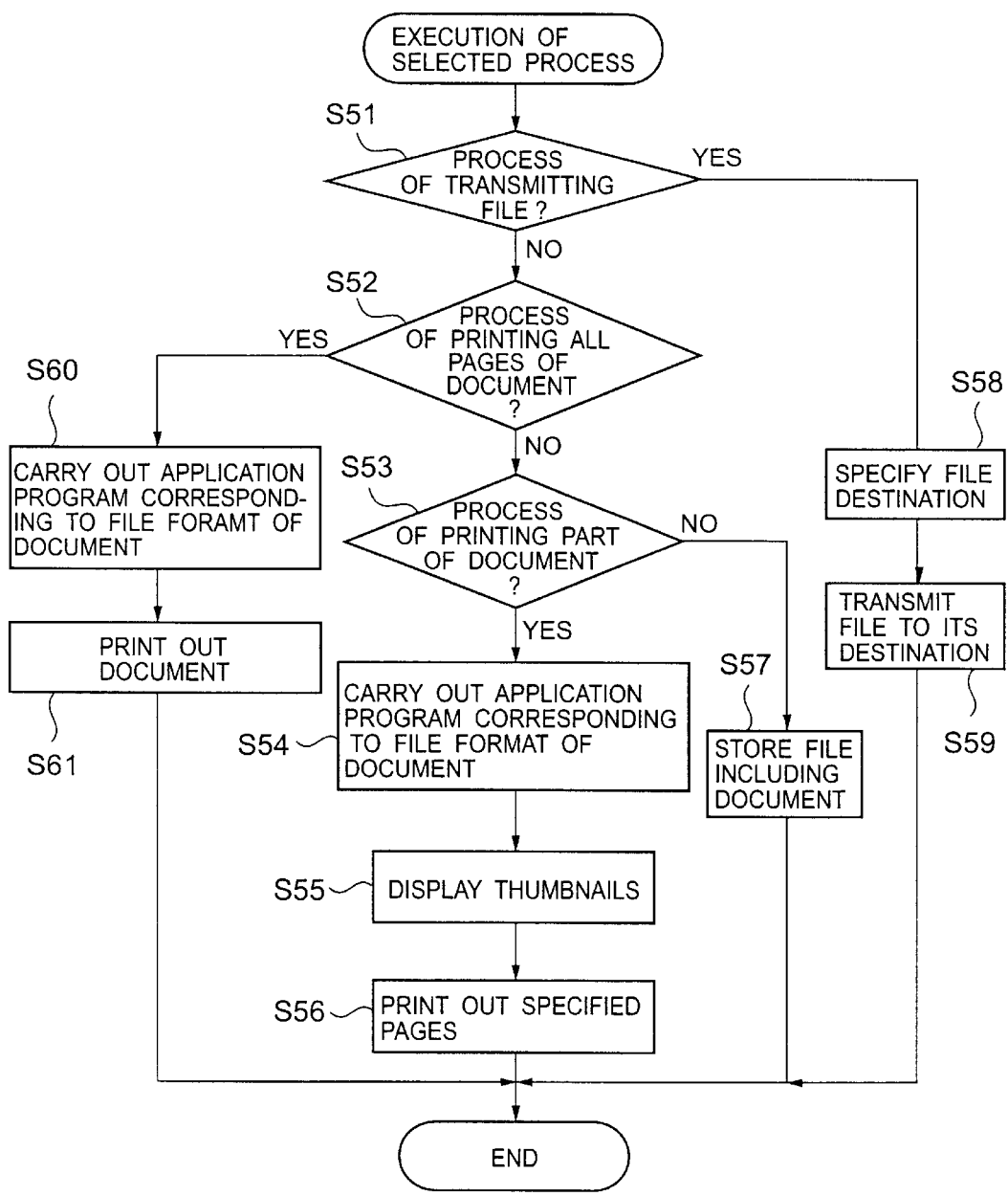
FIG. 13 is a flowchart showing execution of selected processes during the process to read data from the printed matter.

Additionally, in FIG. 13, the steps of determining the contents of a selected process may be performed in any order.

Additionally, the computer, that is the copy machine 5 or the computer 13, can easily detect a skew while reading the printed matter 100, by providing a method of detecting a skew by use of color information, to the processing program stored in the storage device 51, and by coloring the coding part of the printed matter 100.

Furthermore, the use of the printed matter 100 according to the present invention can eliminate a decrease in quality of information recorded on a printed matter that is caused by copying the printed matter for generations. For example, a device can obtain an original document file at the time of creating the printed mater 100 by reading the coding part 113 of the printed matter 100, and, thus, the device can print or make an exact copy of the printed matter 100 repeatedly from the original document file.

A description will now be given of a rewritable medium, a printing device using the rewritable medium and an image forming system using the rewritable medium, in a case in which the rewritable medium is used as the printed matter 100 instead of paper. In the case in which paper is used as the printed matter 100, the printed matter 100 can only be discarded if the printed matter 100 becomes unnecessary. However, the use of a rewritable medium as the printed matter 100 has a merit that information recorded on the printed matter 100 can be erased, and the printed matter 100 can be recycled.

Figure 14:
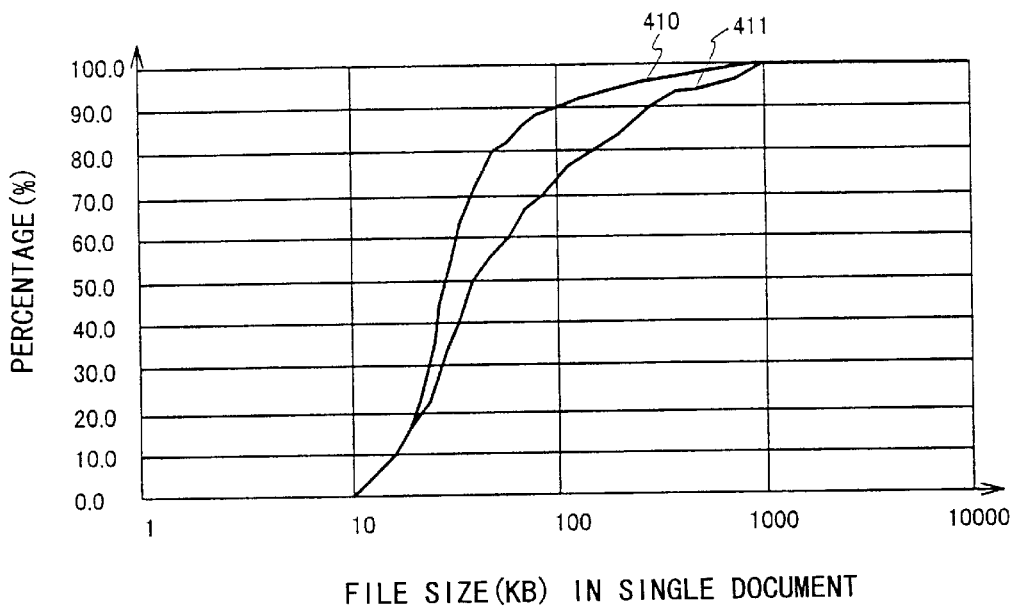
FIG. 14 is a graph showing an average distribution of file sizes used by an individual for a single document.

FIG. 14 is a graph showing an average distribution of file sizes of electronic files owned by an individual for a single document, at an office. A graph 410 shown in FIG. 14 indicates a distribution of file sizes of electronic files used for a Word (a registered trademark) document. Additionally, a graph 411 shown in FIG. 14 indicates a distribution of file sizes of electronic files used for an Excel (a registered trademark) document. As seen from FIG. 14, a size of coded information printed on the printed matter 100 should be at least 1000 KB (1 MB), in a case of applying the electronic files owned by an individual to the printed matter 100 or a system using the printed matter 100).

For example, according to the printing quality of a typical related-art 600 dpi (dot per inch) electronic picture process, a dot density used for printing information is 600 dpi. However, dots are not exactly printed with high reproducibility at 600 dpi because of scattered toner or dust during a printing process, in fact. Even if resolution of a scanner used at an image reading side is set to two to three times higher than a printing density of 600 dpi, an actual printing ability of the electronic picture process is only about 200 dpi.

Considering only a printing function, a visually high-quality image can be obtained by performing an image process or a tone process. However, in the case of using the printed matter 100 as described above, reproducibility of a document by each dot or each bit is significant. The coded information whose size is only 100–200 KB can be printed on the printed matter 100, even in a case of performing an encoding process by reducing a length of information to be printed on the printed matter 100 by eliminating an error correction code from the information. Thus, the printed matter 100 that can hold only 100–200 KB of the coded information is useless at an office. Additionally, in order to improve reliability of the coded information printed on the printed matter 100, wordiness in the encoding process is necessary at some degree. Thus, an amount of the coded information that can be printed on the printed matter 100 is less than 100–200 KB.

The printing quality of printing a dot by a printing process using later-described materials in a thermal mode is higher than that of the above-described related-art electronic picture process. Accordingly, the system using the printed matter 100 can increase the data size of the coded information printed on a sheet of a printed matter by the printing process using the later-described materials in the thermal mode. Additionally, according to the printing process using the later-described materials in the thermal mode, the printed matter 100 can be printed with the high-reproducibility about 600 dpi, indeed.

Figure 15:
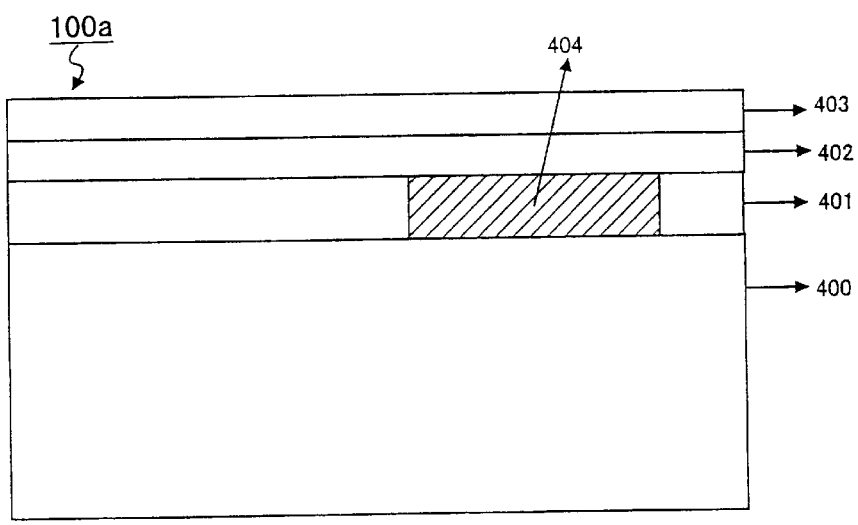
FIG. 15 is a diagram showing a cross sectional view of a printed matter (a heat-reversible recording layer), according to an eleventh embodiment of the present invention.

A description will be given of a rewritable information-displaying medium or a rewritable recording medium as a recording medium according to the present invention, with reference to FIGS. 15, 16 and 17. FIG. 15 is a diagram showing a cross sectional view of a printed matter, according to an eleventh embodiment of the present invention. A medium (recording medium) 100a shown in FIG. 15 includes a base film 400, a heat-reversible recording layer 401, an intermediate layer 402 and a protection layer 403. The base film 400 is provided at the bottom of the medium 100a. The heat-reversible recording layer 401, the intermediate layer 402 and the protection layer 403 are arranged in order on the top of the base film 400. The base film 400 is made of white resin having high thermal conductivity. The intermediate layer 401 and the protection layer 403 are made of transparent resin having high photo-permeability. A thermal recording method, a magnetic recording method, a photochromic recording method or an electrochromic recording method can be utilized in the heat reversible recording layer 401 that can visualize information reversibly, in a reversible recording medium (the medium 100a) according to the present invention.

In the eleventh embodiment of the present invention, the thermal recoding method is preferably applied to a recording layer. In other words, it is preferable to use a recording layer in which visual information can be recorded or erased in accordance with a reversible change in optical characteristics because of thermal energy. For instance, a thermal-sublimation-type printer using a thermal head can easily perform an information recording process using thermal energy in the recording layer. Additionally, the thermal-sublimation-type printer can easily erase the visual information recorded in the recording layer by use of the thermal head used for recording the visual information, by changing conditions such as a heating temperature and a heating time.

In the above-described case, identification information can be printed by use of the thermal-sublimation-type printer, and, thus, a user can set the identification information at the time of printing the printed matter 100, instead of initially recording the identification information as predetermined information in the medium 100a. In addition, the user can print a document ID of another document on the medium 100a in a case of reusing the medium 100a. As described above, the medium 100a can be recycled. Such recoding layer in which reversible recording can be performed by use of the thermal energy is preferred to be a reversible recording layer comprising a recording layer including at least a leuco dye and a developing agent, a resin layer including a particle of a low-molecular organic compound, and a recording layer including a low or high molecular liquid crystal compound.

Additionally, the recording layer including at least a leuco dye and a development agent disperses the leuco dye and the development agent into a resin binder. The leuco dye used in such a reversible recording layer is, for instance, a dye precursor such as a phthalide compound, an azaphthalide compound, a flourane compound, a phenothiazine compound, and a leucoauramine compound. Such recoding layer in which reversible recording can be performed by use of the thermal energy is preferred to be a reversible recording layer comprising a recording layer including at least a leuco dye and a developing agent, a resin layer including a particle of a low-molecular organic compound, and a recording layer including a low or high molecular liquid crystal compound.

Additionally, the development agent used in the above-described reversible recording layer is a compound having a construction such as a phenolic hydroxyl group, a carboxyl group and a phosphate group that make the leuco dye develop a color in a molecule, and a construction such as a combination of a plurality of long-chain alkyl groups that controls a cohesive force between molecules. At a connection part between the long-chain alkyl groups, a bivalent group including a heteroatom may be placed. Additionally, a long-chain alkyl group may include a bivalent group including a heteroatom or an aromatic alkyl group.

Resin composing a resin layer including at least a leuco dye and a developing agent is, for instance, polyvinyl chloride, polyvinyl acetate, a vinyl chloride-acetate copolymer, polyvinyl-butyral, polycarbonate, polyarylate, polysulfone, polyether sulfone, polyphenylene oxide, fluororesin, polyimide, polyamide, polyamideimide, polybenzimidazole, polystyrene, a styrene copolymer, phenoxy resin, polyester, aromatic polyester, polyurethane, polyacrylic ester, pclymethacrylate, a (metha) acrylic ester copolymer, a maleic copolymer, epoxy resin, alkyd resin, silicone resin, phenol resin, polyvinyl-alcohol, denatured polyvinyl-alcohol, polyvinyl-pyrrolidone, polyethylene oxide, polypropylene oxide, methyl cellulose, ethyl cellulose, carboxy-methyl cellulose, hydroxy-ethyl cellulose, amylum, gelatin, casein, or the like.

Additionally, various types of hardening agents and crosslinking agents may be added to the recording layer for the purpose of increasing strength of a film of the recording layer. Examples of such hardening agents and crosslinking agents are a compound having an isocyanate group, polyamide epichlorohydrin resin, a compound having an epoxy group, a glyoxal compound and a zirconium compound.

Further, the recording layer may be provided by use of an electron-beam hardening binder or an ultraviolet hardening binder. Such a hardening binder is, for example, a compound having an ethylene unsaturated link. In details, such a compound is, a combination of polyatomic alcohol belonging to an aliphatic series, an alicyclic series or an aromatic series, and polyacrylate (polymethacrylate) of polyalkylene glycol; polyacrylate (polymethacrylate) of polyatomic alcohol belonging to an aliphatic series, an alicyclic series, an aromatic series or an aroma-aliphatic series, in which polyalkylene oxide is added to the polyatomic alcohol; polyester polyacrylate (polymethacrylate); polyurethane polyacrylate (polymethacrylate); epoxy-polyacrylate (polymethacrylate); polyamide polyacrylate (polymethacrylate); polyacryloyl (polymethacryloyl) oxy-alkylphosphate; a vinyl or diene series having an acryloyl (methacryloyl) group as a terminal radical or a side-chain radical; monofunctional acrylate (methacrylate), vinylpyrrolidone, and acryloyl (methacryloyl) compounds; a cyano compound having an ethylene unsaturated link; monocarboxylic or polycarboxylic acid having an ethylene unsaturated link and, its salt such as alkali metal salt, ammonium salt, amine salt; acrylamide (methacrylamide) or alkyl-substitution acrylamide (methacrylamide), and its polymer; vinyl-lactam and polyvinyl-lactam compounds; monoether or polyether having an ethylene unsaturated link, and its ester; ester of alcohol having an ethylene unsaturated link; polyalcohol having an ethylene unsaturated link, and its ester; an aromatic compound having at least one ethylene unsaturated link such as styrene or divinylbenzene; a polyorganosiloxane compound having an acryloyloxide (methacryloyloxide) group as a terminal radical or a side-chain radical; a silicone compound having an ethylene unsaturated link; polymers of the above-described compounds or an oligo-ester acrylate (methacrylate) object, or the like.

Additionally, a photo polymerization starter is mixed with the recording layer, in a case of forming the recording layer by use of the ultraviolet hardening binder. The photo polymerization starter is, for example, an acetophenone group such as dichloroacetophenone or trichloroacetophenone, 1-hydroxy-cyclohexyl-phenil-ketone, benzophenone, Michler's ketone, benzoin, benzoin alkyl-ether, benzil dimethylketal, tetramethylthiuram monosufide, a thioxanthone group, an azocompound, diallyl iodonium salt, triallyl sulfonium salt, a bis (trichloromethyl) triazine compound, or the like.

Figure 16:
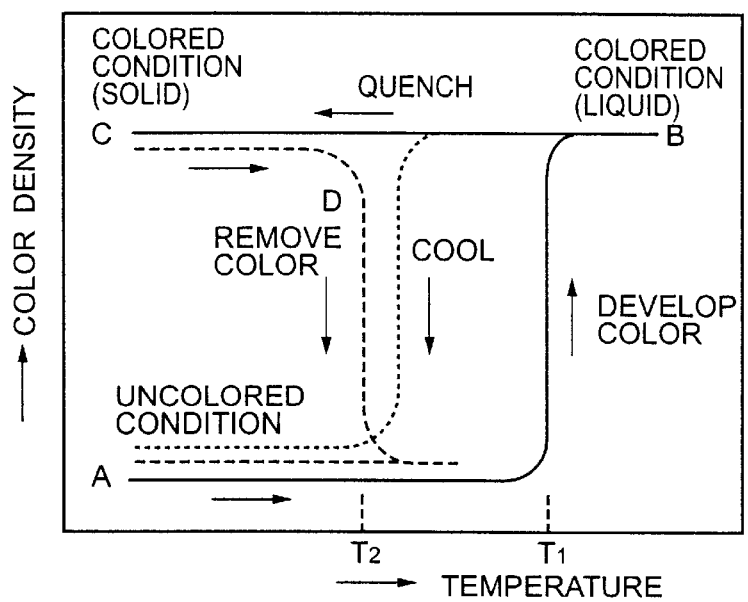
FIG. 16 is a graph showing a relation between a developed-color density and a temperature at the heat-reversible recording layer shown in FIG. 15.

A color is developed or removed according to a process shown in FIG. 16, in the recording layer utilizing the above-described leuco dye and developing agent. A letter "A" in FIG. 16 shows an initial condition of the recording layer. By heating an initial uncolored condition (a condition A) up to a temperature $T_1$ or higher, the leuco dye and the developing agent are melted and mixed together, and, thus, a color is developed (a condition B). If the mixture of the leuco dye and the developing agent is quenched, the developed color is fixed (a condition C). When the mixture is heated at the condition C, the developed color is removed at a temperature $T_2$ that is lower than the temperature $T_1$ (a condition D). Subsequently, by cooling the recording layer, a condition of the recording layer returns to the initial uncolored condition (the condition A).

The above-mentioned resin layer whose reversible recording layer includes a particle of a low-molecular organic compound, is a recording layer whose transparency changes reversibly depending on a temperature of the recording layer. Additionally, such a recording layer is structured using a characteristic of its photo diffusivity changing reversibly depending on a temperature.

Resin used for such a reversible recording layer is made of a material that forms a layer storing low-molecular organic substances spread evenly as well as affects transparency of the reversible recording layer when the transparency is the highest. Accordingly, the resin preferably has high transparency, mechanical stability, and film formability. Examples of such resin are, polyvinyl chloride; a vinyl chloride copolymer such as a vinyl chloride-acetate copolymer, a vinyl chloride-acetate-alcohol copolymer, a vinyl-chloride-acetate maleic-acid copolymer and a vinyl-chloride acrylate copolymer; a vinylidene chloride copolymer such as a polyvinylidene chloride, a vinylidene-vinyl chloride copolymer and a vinylidene-chloride acrylonitrile copolymer; polyester; polyamide; a polyacrylate, polymethacrylate, or acrylate-methacrylate copolymer; silicon resin, and the like. The substances named above may be used separately for the reversible recording layer. Alternatively, a plurality of the above substances may be mixed and used for the reversible recording layer.

Additionally, a low-molecular organic compound used for the reversible recording layer generally has a melting point between 30° C. and 200° C., preferably between 50° C. and 150° C. Such a low-molecular organic compound is, for example, alkanol; alkaneziole; halogenated alkanol or halogenated alkaneziole; alkylamine; alkane; alkene; alkine; halogenated alkane; halogenated alkene; halogenated alkine; cycloalkane; cycloalkene; cycloalkine; saturated/unsaturated monocarboxylic acid, saturated/unsaturated dicarboxylic acid, their ester, their amide, or their ammonium salt; saturated/unsaturated halogenated aliphatic acid, its ester, its amide, or its ammonium salt; arylcarboxylic acid, its ester, its amide, or its ammonium salt; halogenated arylcarboxylic acid, its ester, its amide, or its ammonium salt; thio-alcohol; thiocarboxylic acid, its ester, its amine, or its ammonium salt; carboxylate of thio-alcohol, or the like.

One of the above-described low-molecular organic compounds may be used for the reversible recording layer. Alternatively, a mixture of the low-molecular organic compounds may be used for the reversible recording layer. Each of the low-molecular organic compounds includes 10 to 60, preferably 10 to 38, and specifically 10 to 30 carbon atoms. Additionally, an alcohol-radical part included in ester may be either saturated or unsaturated. Further, the alcohol-radical part may be halogen-substituted. In any cases, a molecule of the low-molecular organic compounds preferably includes at least one of oxygen, nitrogen, sulfur and halogen. For instance, the low-molecular organic compounds are preferred to be compounds including —OH, —COOH, —CONH—, —COOR, —NH—, —NH$_2$, —S—, —S—S—, —O—, or the like. Furthermore, the low-molecular organic compounds may be appropriately combined together, or may be combined with another material, whose melting point is different from melting points of the low-molecular organic compounds, in order to widen a range of a temperature at which the reversible recording layer can become transparent.

Figure 17:
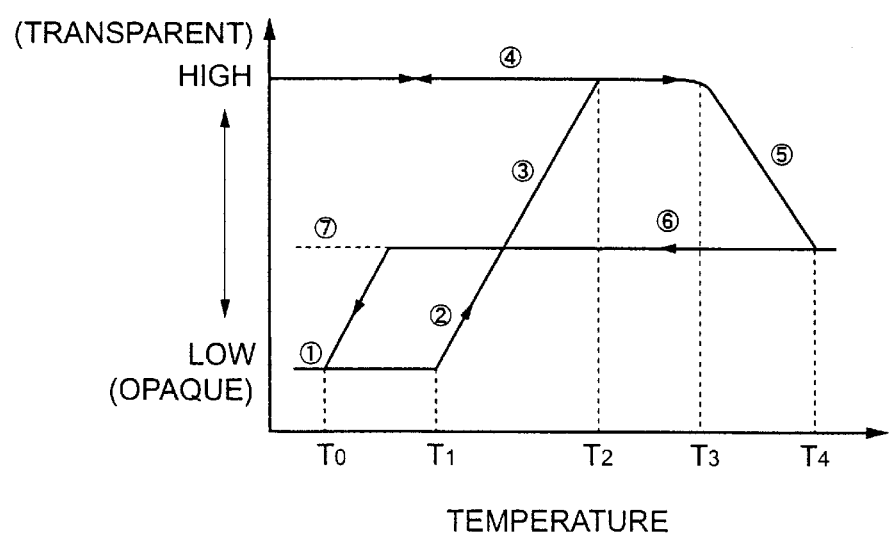
FIG. 17 is a graph showing a relation between transparency and a temperature at the heat-reversible recording layer shown in FIG. 15.

The reversible recording layer formed by the above-described low-molecular organic compounds and resins becomes transparent or cloudy (opaque) in accordance with a process shown in FIG. 17. The reversible recording layer includes resin and low-molecular organic compounds dispersed evenly throughout the resin, as its main ingredients. For instance, at a normal temperature less than or equal to a temperature $T_0$, the reversible recording layer is cloudy or opaque in a condition 1. By heating the temperature of the reversible recording layer to a temperature $T_2$, the reversible recording layer becomes transparent via conditions 2 an 3. The reversible recording layer remains transparent, even if the reversible recording layer is brought into a condition 4, in which the temperature of the reversible recording layer is the normal temperature.

Further, by heating the temperature of the reversible recording layer to a temperature equal to or higher than a temperature $T_3$, the reversible recording layer becomes semitransparent via a condition 5. The semitransparent condition lies between the maximum transparency and the maximum opacity. Subsequently, by lowering the temperature of the reversible recording layer, the reversible recording layer returns to the initial cloudy or opaque condition via a condition 6 without being through the transparent condition.

The reversible recording layer can be in a condition 7 that lies between a transparent condition and a opaque condition, by heating the reversible recoding layer in the initial opaque condition 1 to a temperature between the temperatures $T_1$ and $T_2$, and, then, by cooling the reversible recording layer to the normal temperature. Additionally, the reversible recording layer returns to the initial opaque condition 1 via the condition 6, by reheating the reversible recording layer that has become transparent at the normal temperature in the condition 4 to a temperature equal to or higher than the temperature $T_3$ via the condition 5, and, then, by bringing the temperature of the reversible recording layer back to the normal temperature.

A high-molecular liquid crystal used in a recording layer including a low-molecular or high-molecular liquid crystal is, for instance, a backbone-chain molecular crystal, in which a mesogene (a molecule indicating liquid crystal) is bonded with a main chain. Another example of the high-molecular liquid crystal is a side-chain molecular liquid crystal, in which a mesogene is bonded with a side chain. The high-molecular liquid crystal can be produced by bodding bondable mesogenic compounds (mesogene monomers), or by attaching a mesogenic compound capable of having an addition reaction, to a reactant-type polymer such as hydrogenated polysilicone. Such technologies are disclosed in Makromol. Chem., 179, p273 (1978), Eur, Poly. J., 18, p651 (1982), Mol. Cryst. Liq. Cryst., 169, p167 (1989), and the like. Accordingly, the high-molecular liquid crystal used in the present invention can be produced by following the methods disclosed in the above references.

In addition, typical mesogene monomers and mesogenic compounds capable of having an addition reaction are a variety of compounds, in which an aryl-acid ester group, a methacryl-acid ester group or a vinyl group is bonded, through an alkyl spacer having a fixed length, with a rigid molecule (mesogene). The rigid molecule is, for example, a biphenyl, phenylbenzoate, cyclohexyl-benzene, azoxybenzene, azobenzene, azomethine, phenyl-pyrimidine, diphenyl-acetylene, biphenyl-benzoate, cyclohexyl-biphenyl, or terphenyl molecule.

Figures 18, 19:
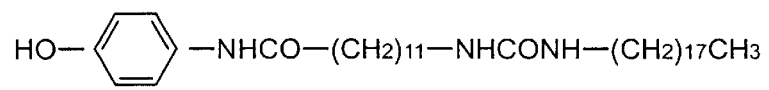
FIG. 18 is a table showing ingredients of a magnetic-recording-layer forming solution.
FIG. 19 is a diagram showing a chemical constitution of a developing agent included in a reversible-thermal-recording-layer forming solution.

A description will now be given of a method of forming layers by use of the above-described materials and a magnetic substance. It should be noted that a description will be given later of an operation of the reversible recording layer by use of the magnetic substance. Initially, a magnetic recording layer having about 10 μm thickness is formed on a front surface of a white polyester film having 100 μm thickness, by coating the white polyester film with a magnetic-recoding-layer forming solution whose ingredients are shown in FIG. 18 by use of a wire bar, and, then, by drying the magnetic-recording-layer forming solution. Subsequently, ingredients of a reversible-thermal-recording-layer forming solution are triturated and dispersed by use of a ball mill so that each grain has an average grain-size of 0.1–3 μm. Consequently, a dispersed solution is obtained. The reversible-thermal-recording-layer forming solution is composed of a 2-anilino 3-methyl 6-dibutyl aminoflourane, a developing agent having a chemical constitution shown in FIG. 19, and a 15% (a weight percentage) tetrahydrofuran (THF) solution of acryl polyols resin, by a respective ratio of 2:8:150.

Subsequently, a recording-layer coating solution is created, by adding a coronet HL to the obtained dispersed solution by a ratio of 20, and, then, by stirring the mixture well. The coronet HL is an adduct-type hexamethylene-diisocyanate 75% (a weight percentage) ethyl-acetate solution, manufactured by Japan Polyurethane. A back surface of the white polyester film having the magnetic recording layer is coated with the created recording-layer coating solution by use of a wire bar, and is dried for two minutes under 100° C. Next, the back surface of the white polyester film is heated for 24 hours under 60° C. Consequently, a recording layer having 8.0 μm thickness is formed on the back surface of the white polyester film.

A top surface of the created recording layer is coated with a protection-layer forming solution by use of a wire bar. Subsequently, the recording layer is hardened, by carrying the recording layer at a speed of 9 m/minute through an ultraviolet lamp whose irradiation energy is 80 W/cm². Consequently, a protection layer having 2 μm thickness is provided on the top of the recording layer. As described above, a reversible thermal recording medium is created. It should be noted that the protection-layer forming solution is composed of urethane-acrylate ultraviolet hardening resin (ex. C7-157 manufactured by Dainippon Ink) and ethyl-acetate by a respective ratio of 10:90.

A description will now be given of an information-management system using the above-described medium 100a, according to a twelfth embodiment of the present invention. In a case of using the recording medium 100a in the information-management system, a thermal process using a thermal head is substituted for a writing process applied to a printer or a copy machine that uses the printed matter 100.

Figure 20A:
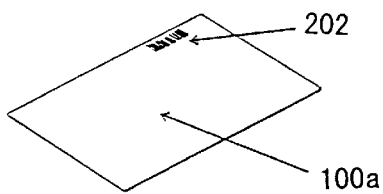
FIGS. 20A and 20B are diagrams showing a layout of an information-management system according to a twelfth embodiment of the present invention.
Figure 20B:
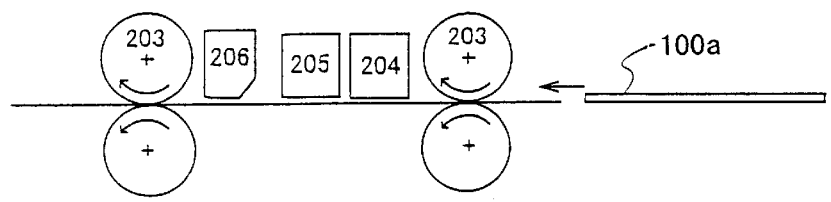

FIGS. 20A and 20B are diagrams showing an information-management system according to a twelfth embodiment of the present invention. The medium 100a shown in FIG. 20A is a heat-reversible displaying medium developing a color and removing the color repeatedly in accordance with a temperature added thereto. A bar code 202 including fixed information is provided to the medium 100a.

The information-management system shown in FIG. 20B includes a medium-conveying device 203, an information-reading device 204, an information-erasing thermal head 205, and an information-printing thermal head 206. The information-reading device 204, the information-erasing thermal head 205 and the information-printing thermal head 206 are provided along with a conveyance path in order, starting from the right side of the information-management system shown in FIG. 20B, that is, an entrance of the conveyance path. The medium 100a is controlled and carried through the conveyance path by the medium-conveying device 203 during an information-printing process.

Figure 21:
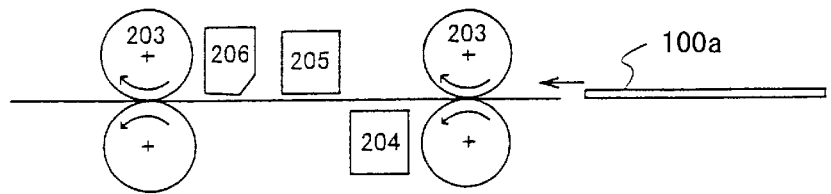
FIG. 21 is a diagram showing another layout of the information-management system shown in FIG. 20B.

The information-reading device 204 may be installed on the same side as the information-erasing thermal head 205 and the information-printing thermal head 206 with respect to the medium 100a carried through the conveyance path, as shown in FIG. 20B. Alternatively, the information-reading device 204 may be installed on the other side, as shown in FIG. 21. In the structure shown in FIG. 21, visible information recognized by a user can be record on the entire area of a front surface (an upper side of the medium 100a shown in FIG. 21) of the medium 100a. Additionally, all the coded information obtained by encoding the visible information can be recorded, for instance, on a magnetic substance that is provided on the entire area of a back surface (a lower side of the medium 100a shown in FIG. 21). In other words, by structuring the information-reading device 204 with a magnetic head and the like, and by forming the magnetic substance storing magnetically record information on the back surface of the medium 100a, desired information can be read from the back surface of the medium 100a by use of the magnetic head.

Figure 22:
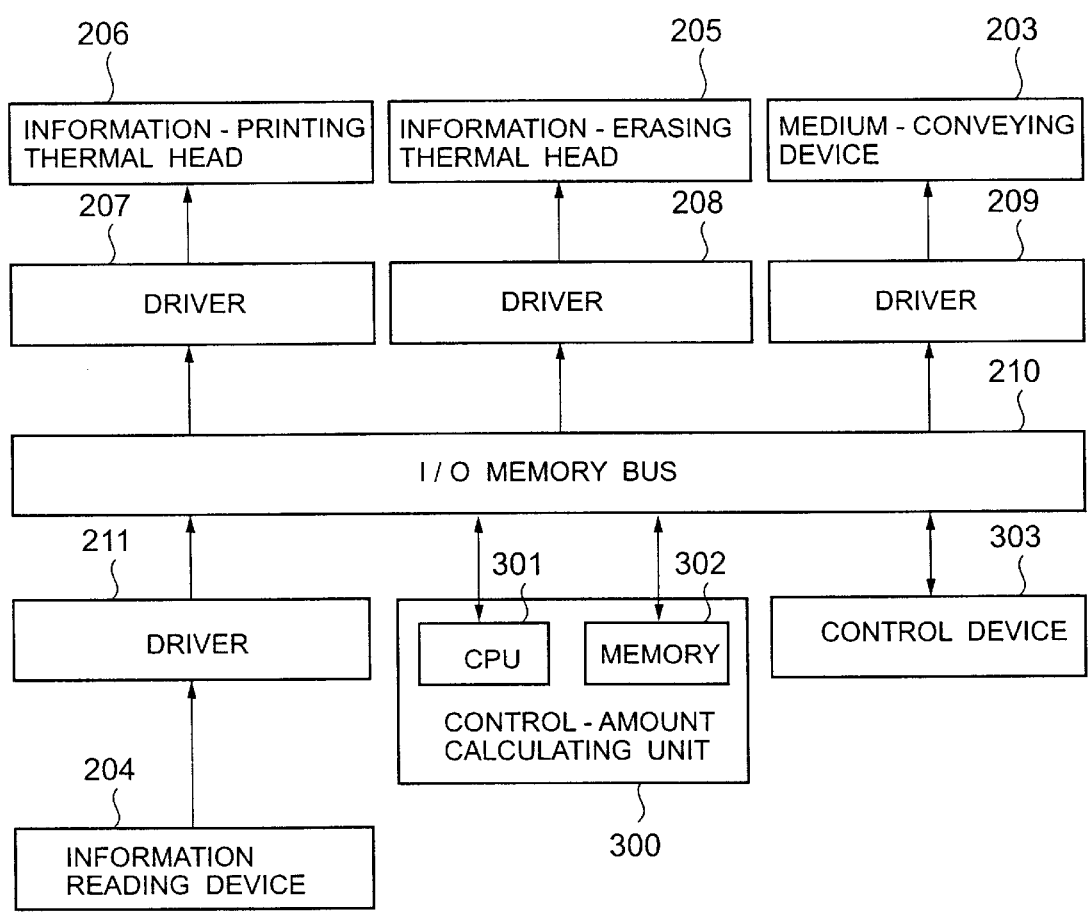
FIG. 22 is a block diagram showing a structure of an information-management system according to a thirteenth embodiment of the present invention.

FIG. 22 is a block diagram showing a structure of an information-management system according to a thirteenth embodiment of the present invention. As shown in FIG. 22, the information-management system includes the medium-conveying device 203, information-reading device 204, the information-erasing thermal head 205, the information-printing thermal head 206, drivers 207, 208, 209 and 211, an I/O (Input/Output) memory bus 210, a control-amount calculating unit 300, and a control device 303. The control-amount calculating unit 300 includes a CPU (Central Processing Unit) 301 and a memory 302.

The control device 303 controls heating of the information-erasing thermal head 205 and the information-printing thermal head 206 to an appropriate temperature for erasing information from the medium 100a and an appropriate temperature for printing information on the medium 100a, respectively. Additionally, the control device 303 controls the medium-conveying device 203 to carry paper or the medium 100a at an appropriate speed.

The control-amount calculating unit 300 includes the CPU 301 and the memory 302, and calculates a control amount for controlling the control device 303 based on information read by the information-reading device 204 from the paper or the medium 100a. In addition, the control-amount calculating unit 300 exchanges data among the above-described units included in the information-management system through the I/O memory bus 210.

Additionally, the bar code 202 shown in FIG. 20A holds information (record information) necessary for an information-printing operation or an information-erasing operation performed on the medium 100a. Such necessary information can be recorded magnetically on the medium 100*a*, or can be recorded as optically detectable symbols. A magnetic information-reading device, a symbol reader or the like is used as the information-reading device 204 in accordance with a selected information-recording format.

A summary will now be given of information-recording methods such as the use of the bar code 202, and the information-reading device 204. One of the information-recording methods is a magnetic information-recording method. In the case of recording information magnetically, a method known as a magnetic card is used. In other words, the medium 100*a* includes a magnetic substance on an entire surface or a part of the surface. The information-reading device 204 reads magnetic information recorded on the medium 100*a* by use of a Hall element, a magneto-resistance device, or the like. In the case of using the magnetic card, information is recorded on the medium 100*a* by magnetizing the magnetic substance formed on the medium 100*a* regularly.

On the other hand, in the case of recording information as optically detectable symbols instead of the above-described bar code 202, the information-reading device 204 uses a method know as a bar-code system. The bar-code system is composed of a printed bar code and a bar-code reader. The bar-code reader reads bar-code information, by irradiating the printed bar code by using an LED (Light Emitting Diode) or the like, and by detecting intensity of light reflected by the printed bar code by using a CCD (Charge Coupled Device), a photo diode, or the like.

Information recoded as the bar code 202 or the like includes a manufacturer's name, a production lot number. In addition, the information includes characteristic information about the medium 100*a* given for each of different color-developing characteristics and color-removing characteristics, information about color-developing/color-removing characteristics of the medium 100*a* themselves such as color-developing/color-removing temperatures and color-developing/color-removing speeds, and the like.

The control-amount calculating unit 300 includes the CPU 301 and the memory 302, and calculates a control amount, based on the characteristic information about the medium 100*a* read by the information-reading device 204, for executing information-printing and information-erasing operations. Heating temperatures and heating speeds of the thermal heads, or a conveying speed of paper or the medium 100*a* corresponds to the control amount calculated by the control-amount calculating unit 300. On the other hand, the control device 303 prints information to, or erases information from the medium 100*a*, by controlling temperatures of the thermal heads, a conveying speed of paper, or the like, based on the control amount calculated by the control-amount calculating unit 300. The control device 303 also includes a CPU, a memory, and the like generally. However, the control-amount calculating unit 300 may carry out a control operation, instead of the control device 303. In such a case, the control device 303 and the control-amount calculating unit 300 may be combined as a single device.

Additionally, in a case in which index information is recorded on the medium 100*a* by use of the bar code 202 and the like, the memory 302 stores characteristic information corresponding to the index information, in advance. The control-amount calculating unit 300, then, reads characteristic information corresponding to index information read from the medium 100*a*, and calculates the control amount based on the characteristic information. For instance, the memory 302 initially stores a table shown in FIG. 23. As shown in FIG. 23, a color-removing temperature, a color-developing temperature and a conveying speed are recorded in the memory 302 for each medium characteristic number, which is a manufacturer's name, a production lot number, or the like.

As described later, a printing device according to the present invention adjusts a control amount in an information-printing operation or an information-erasing operation in accordance with information recorded as the bar code 202 or the like. Accordingly, the bar code 202 or the like is preferably read at the beginnings of the information-printing operation and the information-erasing operation. Additionally, in a case of using a magnetic-card format or a bar-code format to the medium 100*a*, the bar code 202 or the like is preferably placed at a tip of the medium 100*a* or in a header of the medium 100*a*. It should be noted that descriptions about the information-erasing thermal head 205 and the information-printing thermal head 206 are omitted, since well-known thermal heads are used as the information-erasing thermal head 205 and the information-printing thermal head 206.

Figure 24:
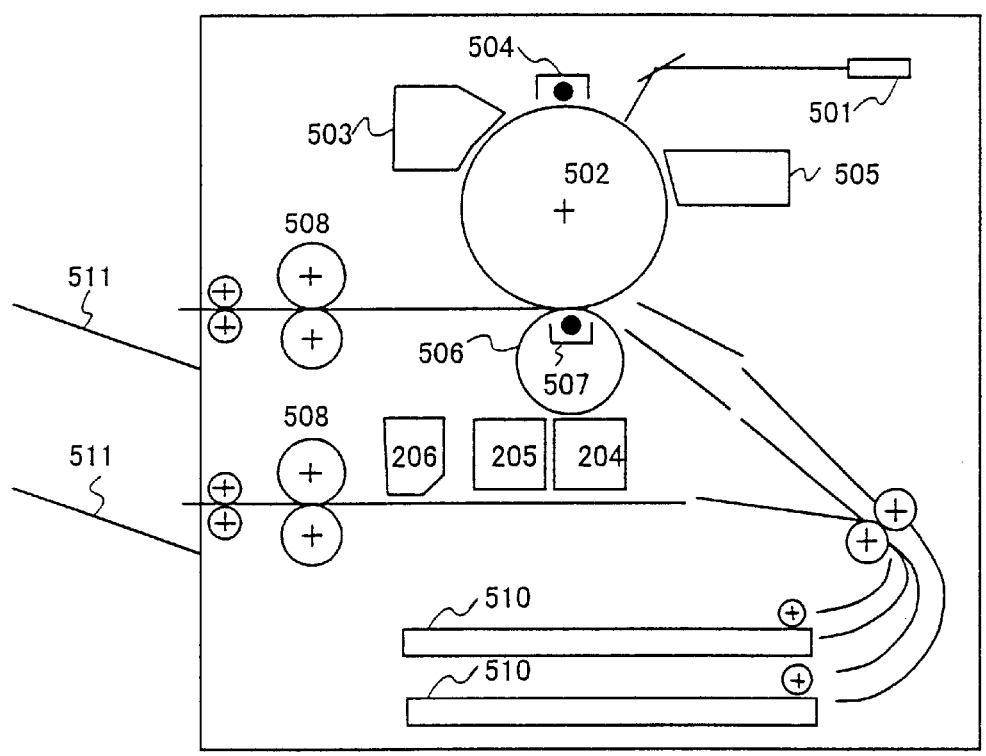
FIG. 24 is a diagram showing a structure of a laser printer according to a fourteenth embodiment of the present invention.

The above-described information-management system is, for instance, structured as a laser printer shown in FIG. 24. According to a fourteenth embodiment of the present invention, the laser printer shown in FIG. 24 includes a laser-writing unit 501, a photosensitive substance 502, a cleaning device 503, a static-electricity charger 504, a developing device 505, a copying drum 506, a copying charger 507, a fixing device 508, a paper-supplying device 510 and a paper-ejecting tray 511. The rewritable medium 100*a* is initially set at the paper-supplying device 510. Information is printed on the medium 100*a* by the information-printing thermal head 206, or is erased from the medium 100*a* by the information-erasing thermal head 205. The photosensitive substance 502 and the copying drum 506 print information on paper set at the paper-supplying device 510.

Figure 25:
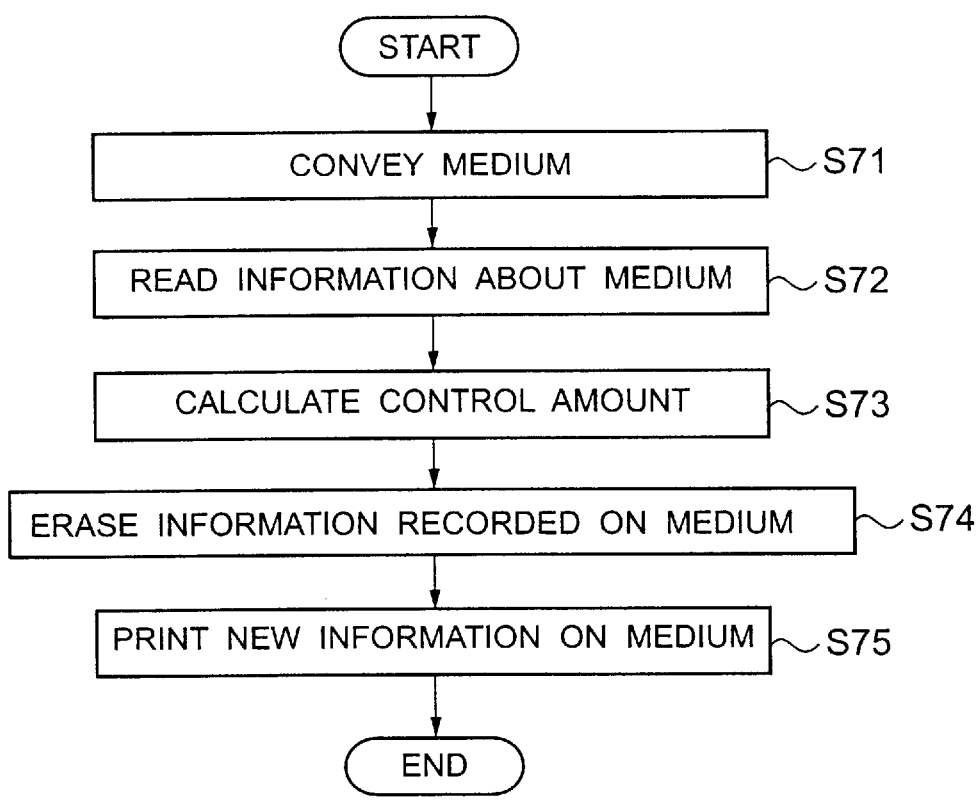
FIG. 25 is a flowchart showing a process performed by the information-management system shown in FIG. 22.

A description will now be given of an operation performed by the information-management system according to the present invention, with reference to a flowchart shown in FIG. 25. When an information-printing process or an information-erasing process starts, the medium-conveying device 203 carries the medium 100*a* through the conveyance path, at a step S71. Subsequently, at a step S72, the information-reading device 204 reads information recorded in the bar code 202 or the like, and temporarily stores the information in the memory 302. At a step S73, the CPU 301 included in the control-amount calculating unit 300 calculates a control amount necessary for printing information on or erasing information from the medium 100*a*, based on the information temporarily stored in the memory 302.

If the information temporarily stored in the memory 302 is characteristic information about a color-developing temperature and the like, the control-amount calculating unit 300 calculates a control amount about temperatures of the thermal heads, a paper feeding speed and the like. If "XXXX2" is read as the medium-characteristic number in the case in which the table shown in FIG. 23 is stored in the memory 302 in advance, the information-printing/information-erasing characteristics of the medium 100*a* are recognized as the color-removing temperature of 120° C., the color-developing temperature of 174° C., and the conveying speed of 28 mm/sec. Then, the control-amount calculating unit 300 calculates a control amount used for setting temperatures of the thermal heads and a medium-conveying speed corresponding to the above information-printing/information-erasing characteristics.

Subsequently, at a step S74, the control device 303 controls the medium-conveying device 203 and the information-erasing thermal head 205 in accordance with the control amount calculated by the control-amount calculating unit 300 at the step S73. Taking the step S74, the control device 303 erases information recorded on the medium 100a by heating the medium 100a to a fixed temperature. At a step S75, the control device 303 controls the medium-conveying device 203 and the information-printing thermal head 206 in accordance with the control amount calculated by the control-amount calculating unit 300 at the step S73. Taking the step S75, the control device 303 prints information on the medium 100a, to which the step S74 has been performed, by heating the medium 100a to a fixed temperature. As described above, desired information is recorded on the medium 100a.

The information-management system and all the processes performed by the information-management system can be written in terms of a computer program. Such a computer program may be stored in a recording medium such as a CD-ROM, an optical disk, a semiconductor memory, or a hard disk. Accordingly, the above-described processes can be performed easily, by installing the recording medium, and by executing the computer program.

According to the present invention, by use of a data sheet such as the printed matter 100, the medium 100a, or the like, electronic document data can be distributed, or carried with a user. In addition, the data sheet provides visible information such as a reduced image of the electronic document data thereon, and, thus, the user can recognize the electronic document data just by looking the visible information.

Additionally, according to the present invention, the information-management system can easily manage information by use of a single data sheet. Thus, the information-management system can save resources necessary for information management.

Additionally, consumption of the resources can be further reduced by use of a data sheet having a reversible recording layer, since information recorded on the data sheet is easily rewritable.

Additionally, characteristic information indicating information-printing/information-erasing characteristics of the data sheet is recorded on the data sheet. Information-printing/information-erasing operations can be optimized according to the characteristic information about the data sheet, by use of a data-sheet creating device printing information on or erasing information from the data sheet in accordance with the characteristic information read from the data sheet. Thus, the data-sheet creating device can easily obtain a highly reliable data sheet. The data-sheet creating device is, for instance, the above-described system, printer, information-management system, laser printer, or the like.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Applications No. 2000-289368, filed on Sep. 22, 2000, and No. 2000-099646, filed on Mar. 31, 2000, the entire contents of which are hereby incorporated by reference.

What is claimed is:

1. A data sheet readable by a reading device, comprising:
    a first area recording entire data obtained by encoding all information included in a document; and
    a second area displaying an image of at least part of the document for a user to preview the document, the image being visibly printed and fixed on the data sheet.

2. The data sheet as claimed in claim 1, further comprising a third area storing a check box used by the user for notifying said reading device about contents of a process to be performed by said reading device.

3. The data sheet as claimed in claim 1, further comprising a third area storing a control code instructing said reading device to carry out a fixed process.

4. The data sheet as claimed in claim 1, comprising a third area storing a password encoded to a code readable by said reading device.

5. The data sheet as claimed in claim 1, wherein said first area is provided on one surface, and said second area is provided on the other surface.

6. The data sheet as claimed in claim 1, wherein at least said first area is printed in color.

7. The data sheet as claimed in claim 1, wherein the data displayed in the first area is adapted to be read by a scanner to reproduce the image stored in the second area.

8. The data sheet as claimed in claim 1, wherein the data sheet comprises a recording sheet adapted to receive handwritten input.

9. The data sheet as claimed in claim 1, further comprising:
    a third area adapted to receive a trace of a handwritten input to be read by a scanning device for conversion into predetermined information.

10. A data sheet readable by a reading device, comprising:
    a first area displaying entire data obtained by encoding all information included in a document;
    a second area storing an image of at least part of the document for a user to preview the document;
    a supporting layer as a basis of said data sheet; and
    a reversible recording layer provided on said supporting layer.

11. The data sheet as claimed in claim 10, wherein said reversible recording layer has a reversible optical characteristic to thermal energy.

12. The data sheet as claimed in claim 10, wherein said reversible recording layer includes leuco dye and a developing agent.

13. The data sheet as claimed in claim 10, wherein said reversible recording layer is a resin layer including a grain of a low-molecular organic compound.

14. The data sheet as claimed in claim 10, wherein said reversible recording layer includes a low-molecular or high-molecular liquid crystal compound.

15. A data sheet readable by a reading device, comprising:
    a first area displaying entire data obtained by encoding all information included in a document;
    a second area storing an image of at least part of the document for a user to preview the document; and
    a characteristic-information storing area storing information about information-printing/information-erasing characteristics of said data sheet.

16. A data sheet readable by a reading device, comprising:
    a first area displaying entire data obtained by encoding all information included in a document;
    a second area storing an image of at least part of the document for a user to preview the document; and
    an information storing area, in which manufacturer identification and a lot number of said data sheet are recorded.

17. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, the image being visibly printed and fixed on the data sheet.

18. The data-sheet creating device as claimed in claim 17, wherein the data sheet comprises a recording sheet adapted to receive handwritten input.

19. The data-sheet creating device as claimed in claim 17, wherein the data sheet includes a third area adapted to receive a trace of a handwritten input to be read by a scanning device for conversion into predetermined information.

20. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, wherein said data sheet further includes a third area, and said data-recording unit records a check box in the third area, said check box being used by the user to notify said reading device about contents of a process to be performed by said reading device.

21. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, wherein said data sheet further includes a third area, and said data-recording unit records a control code in the third area, said control code instructing said reading device to carry out a fixed process.

22. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, wherein said data sheet further includes a third area, and said data-recording unit records a password encoded to a code readable by said reading device.

23. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, and a selecting unit selecting at least the part of said document recorded in said second area by an instruction from the user.

24. A data-sheet creating device that records data on a data sheet, said data sheet including a first area and a second area, said data-sheet creating device comprising a data-recording unit recording an entire document in said first area by encoding the entire document to a code readable by a reading device, and displaying a reduced image of at least a part of the document in said second area for a user to preview the document, wherein said data sheet further includes characteristic information indicating information-printing/information-erasing characteristics of said data sheet, and said data-recording unit reads the characteristic information from said data sheet, and prints information to or erases information from said data sheet in accordance with said characteristic information.

25. A recording medium readable by a computer, tangibly embodying a program of instructions executable by the computer to create a data sheet including a first area and a second area, said program comprising the steps of:
  recording an entire document on said first area by encoding the entire document to a code readable by the computer; and
  displaying a reduced image of at least a part of said document on said second area for a user to preview the document, the image being visibly printed and fixed on the data sheet.

26. The recording medium as claimed in claim 25, wherein the data sheet comprises a recording sheet adapted to receive handwritten input.

27. The recording medium as claimed in claim 25, wherein the data sheet includes a third area adapted to receive a trace of a handwritten input to be read by a scanning device for conversion into predetermined information.

28. An information-printing device printing an electronic document, based on a data sheet that includes a first area recording encoded information obtained by encoding an entire document and a second area displaying a reduced image of at least a part of the document for a user to preview the document, the image being visibly fixed and printed on the data sheet, said information-printing device comprising:
  a data reading unit reading said encoded information from said data sheet;
  a decoding unit decoding said encoded information to obtain decoded information; and
  a printing unit printing information corresponding to at least the part of said document included in said reduced image among said decoded information.

29. The information-printing device as claimed in claim 28, wherein the data sheet comprises a recording sheet adapted to receive handwritten input.

30. The information-printing device as claimed in claim 28, wherein the data sheet includes a third area adapted to receive a trace of a handwritten input to be read by a scanning device for conversion into predetermined information.

31. An information-printing device printing an electronic document, based on a data sheet that includes a first area displaying encoded information obtained by encoding an entire document and a second area storing a reduced image of at least a part of the document for a user to preview the document, said information-printing device comprising:
  a data reading unit reading said encoded information from said data sheet;
  a decoding unit decoding said encoded information to obtain decoded information;
  a printing unit printing information corresponding to at least the part of said document included in said reduced image among said decoded information; and
  a processing unit obtaining an application program corresponding to a file format of said decoded information.

32. The information-printing device as claimed in claim 31, wherein said processing unit transfers said decoded information to an external device.

33. An information-printing device printing an electronic document, based on a data sheet that includes a first area displaying encoded information obtained by encoding an entire document and a second area storing a reduced image of at least a part of the document for a user to preview the document, said information-printing device comprising:

a data reading unit reading said encoded information from said data sheet;

a decoding unit decoding said encoded information to obtain decoded information;

a printing unit printing information corresponding to at least the part of said document included in said reduced image among said decoded information; and a document-processing unit, wherein said data sheet includes a third area storing a check box used for requesting for a process to said document, and said document-processing unit carries out the process to said document in accordance with existence of a mark written in said check box.

34. An information-printing device printing an electronic document, based on a data sheet that includes a first area displaying encoded information obtained by encoding an entire document and a second area storing a reduced image of at least a part of the document for a user to preview the document, said information-printing device comprising:

a data reading unit reading said encoded information from said data sheet;

a decoding unit decoding said encoded information to obtain decoded information;

a printing unit printing information corresponding to at least the part of said document included in said reduced image among said decoded information; and a document-processing unit, wherein said data sheet includes a third area storing a control code instructing said information-printing device to perform a process to said document, said decoding unit decodes said control code, and said document-processing unit performs the process to said document by following said control code decoded by said decoding unit.

35. An information-printing device printing an electronic document, based on a data sheet that includes a first area displaying encoded information obtained by encoding an entire document and a second area storing a reduced image of at least a part of the document for a user to preview the document, said information-printing device comprising:

a data reading unit reading said encoded information from said data sheet;

a decoding unit decoding said encoded information to obtain decoded information;

a printing unit printing information corresponding to at least the part of said document included in said reduced image among said decoded information;

a password-inputting unit accepting a second password inputted by the user; and a document-processing unit collating said first password and said second password, and performing a process to said decoded information if said first password matches said second password, wherein said data sheet includes a third area storing an encoded first password, and said decoding unit decodes said encoded first password.

36. An information-printing device printing an electronic document, based on a data sheet that includes a first area displaying encoded information obtained by encoding an entire document and a second area storing a reduced image of at least a part of the document for a user to preview the document, said information-printing device comprising:

a data reading unit reading said encoded information from said data sheet;

a decoding unit decoding said encoded information to obtain decoded information; and a printing unit printing information corresponding to at least the part of said document included in said reduced image among said decoded information, wherein said printing unit prints the information corresponding to at least the part of said document, by following a file format of said decoded information.

37. An information-management system managing document information by use of a data sheet including a first area and a second area, comprising:

a data-recording unit recording an entire document in the first area by encoding the entire document to a code readable by a computer, and displaying a reduced image of at least a part of the document in the second area for a user to preview the document, the image being visibly printed and fixed on the data sheet;

a data reading unit reading said code from said data sheet;

a decoding unit decoding said code to obtain decoded document; and a printing unit printing at least the part of the document included in the reduced image among said decoded document.

38. The information management system as claimed in claim 37, wherein the data sheet comprises a recording sheet adapted to receive handwritten input.

39. The information management system as claimed in claim 37, wherein the data sheet includes a third area adapted to receive a trace of a handwritten input to be read by a scanning device for conversion into predetermined information.

40. A data sheet readable by a reading device, comprising:

a first area having entire data printed on the data sheet, the entire data obtained by encoding all information included in the document; and a second area displaying an image of at least part of the document for a user to preview the document, the image being visibly printed and fixed on the data sheet.

* * * * *